(12) United States Patent
Goethals

(10) Patent No.: US 10,513,620 B2
(45) Date of Patent: Dec. 24, 2019

(54) UV CURABLE INKJET INKS

(71) Applicant: AGFA NV, Mortsel (BE)

(72) Inventor: Fabienne Goethals, Mortsel (BE)

(73) Assignee: AGFA NV, Mortsel (BE)

( * ) Notice: Subject to any disclaimer, the term of this patent is extended or adjusted under 35 U.S.C. 154(b) by 0 days.

(21) Appl. No.: 15/767,171

(22) PCT Filed: Oct. 11, 2016

(86) PCT No.: PCT/EP2016/074291
§ 371 (c)(1),
(2) Date: Apr. 10, 2018

(87) PCT Pub. No.: WO2017/064033
PCT Pub. Date: Apr. 20, 2017

(65) Prior Publication Data
US 2019/0071578 A1    Mar. 7, 2019

(30) Foreign Application Priority Data

Oct. 13, 2015    (EP) .................................. 15189608

(51) Int. Cl.
| | |
|---|---|
| *B41J 11/00* | (2006.01) |
| *C09D 11/10* | (2014.01) |
| *C09D 11/107* | (2014.01) |
| *C09D 11/101* | (2014.01) |
| *C09D 11/322* | (2014.01) |
| *C09D 11/38* | (2014.01) |
| *B41M 7/00* | (2006.01) |

(52) U.S. Cl.
CPC ........... *C09D 11/107* (2013.01); *B41J 11/002* (2013.01); *B41M 7/0081* (2013.01); *C09D 11/101* (2013.01); *C09D 11/322* (2013.01); *C09D 11/38* (2013.01)

(58) Field of Classification Search
CPC ............................ B41J 11/002; C09D 11/107
See application file for complete search history.

(56) References Cited

U.S. PATENT DOCUMENTS

| | | | |
|---|---|---|---|
| 2012/0225968 A1 | 9/2012 | Nakano et al. | |
| 2013/0053469 A1 | 2/2013 | Kappaun | |
| 2014/0002556 A1* | 1/2014 | Sato | C09D 11/30 347/100 |
| 2014/0362150 A1 | 12/2014 | Yamashita et al. | |
| 2015/0111981 A1 | 4/2015 | Fu et al. | |
| 2015/0175819 A1* | 6/2015 | Kamada | C09D 11/38 347/21 |

FOREIGN PATENT DOCUMENTS

| | | |
|---|---|---|
| EP | 2 053 101 A1 | 4/2009 |
| WO | 88/00961 A1 | 2/1988 |

OTHER PUBLICATIONS

Official Communication issued in International Patent Application No. PCT/EP2016/074291, dated Jan. 5, 2017.

* cited by examiner

*Primary Examiner* — Jason S Uhlenhake
(74) *Attorney, Agent, or Firm* — Keating and Bennett, LLP

(57) ABSTRACT

An aqueous UV free radical curable inkjet ink contains a liquid phase A dispersed in a continuous liquid phase B by a polymeric dispersant; wherein the liquid phase A contains at least a photoinitiator, a colour pigment, and one or more polymerizable compounds, and the continuous liquid phase B contains water and optionally one or more organic solvents.

14 Claims, 1 Drawing Sheet

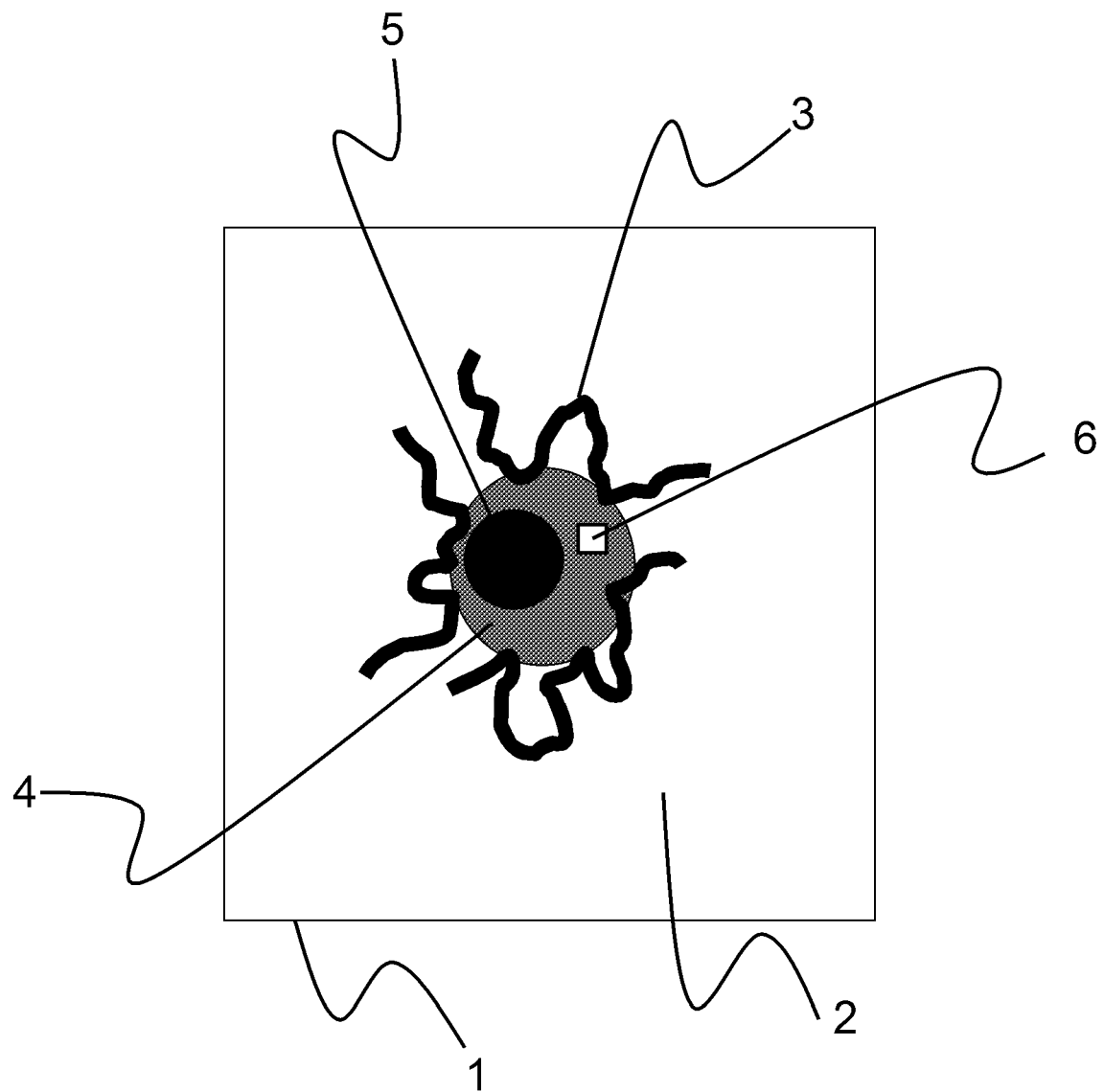

UV CURABLE INKJET INKS

CROSS REFERENCE TO RELATED APPLICATIONS

This application is a 371 National Stage Application of PCT/EP2016/074291, filed Oct. 11, 2016. This application claims the benefit of European Application No. 15189608.1, filed Oct. 13, 2015, which is incorporated by reference herein in its entirety.

BACKGROUND OF THE INVENTION

1. Field of the Invention

The present invention relates to UV curable inkjet inks and printing methods therewith.

2. Description of the Related Art

Over the last years, offset and flexographic printing systems have increasingly been replaced by industrial inkjet printing systems due to their flexibility in use, e.g. variable data printing, and due to their enhanced reliability allowing their incorporation into production lines.

Radiation curable inkjet inks have been the preferred choice of ink because high quality images can be printed even on non-absorbing ink-receivers, such as plastic foils for food packaging.

Special UV curable inkjet inks have been developed that meet the migration limits for ink components when printing on food packaging. For example, EP 2053101 A (AGFA) discloses free radical curable liquids and inks for inkjet printing of food packaging materials comprising no initiator or otherwise one or more initiators selected from the group consisting of non-polymeric di- or multifunctional initiators, oligomeric initiators, polymeric initiators and polymerizable initiators and having a very specific polymerizable composition.

There has been some criticism that (meth)acrylates give off an unpleasant odour before and after curing, which can irritate the eyes, skin and respiratory organs.

In one approach, this criticism has been addressed by trying to replace the (meth)acrylates in the UV curable inkjet ink by other polymerizable compounds. For example, US 2013053469 A (DURST) discloses to manufacture inkjet inks by replacing (meth)acrylates by vinyl based monomers, such as vinyl esters, vinyl carbonates and vinyl carbamates. However, these monomers tend to cure much slower, causing both problems of migration and productivity loss of the printing process.

In another approach, the amount of (meth)acrylates in the UV curable inkjet ink was reduced by replacing it by water or organic solvents. For example, US 2012225968 A (SEIKO EPSON) discloses an aqueous UV curable inkjet ink including: a pigment; a water-soluble organic solvent; a surfactant; at least either of a urethane (meth)acrylate having a weight average molecular weight of 1,000 to 10,000 and a cross-linked urethane (meth)acrylate having a constitutional unit including the urethane (meth)acrylate; a compound having radical polymerizable groups; a photoradical polymerization initiator; and water. However, it was found that storage stability of such an inkjet ink was limited. An improvement for this storage stability, and also spreading of the ink on a substrate, is disclosed in US 2014002556 A (SEIKO EPSON) by including a specific polyether-modified silicone oil in the aqueous UV curable inkjet ink. However, oils do not evaporate and may deteriorate the substrate, e.g. a card board. The colorant used in both patents is a colour pigment dispersed in the aqueous phase as a self-dispersible pigment or with the aid of a polymeric dispersant.

US 2015111981 A (FU ET AL.) discloses a method of preparing UV-curable inkjet pigment ink for textile printing, in which mini-emulsion techniques are used to encapsulate monomer, photo initiator, thermal initiator and pigment in mini-emulsion particles to make a UV-curable pigment paste, and the UV-curable pigment paste is mixed with water-soluble co-solvent, surfactant and water to make a UV-curable pigment ink. It was found that to increase the monomer conversion rate in such a pigmented UV curable inkjet ink using a pigment paste that a thermal initiator had to be incorporated, which reduced the storage stability.

Hence there remains a need for improved UV curable inkjet inks that exhibit less bad odour or skin-sensitization, while maintaining good cure speed and storage stability.

SUMMARY OF THE INVENTION

In order to overcome the above problems, preferred embodiments of the present invention have been realised with an aqueous UV free radical curable inkjet ink as defined below.

It was found that by applying several measures that stable aqueous UV curable inkjet inks were obtained have good curing speed and no odour.

A first measure is to use a liquid phase instead of a paste for the UV curable dispersed phase. Hereby good curability and spreading is maintained so that no thermal initiator becomes necessary.

A second measure is to incorporate the colour pigment in the UV curable liquid phase. This results in a mono-colloid system exhibiting higher storage stability than when the colorant would be included in the aqueous continuous phase.

A third measure is that the UV curable liquid phase is free radical curable chemistry, since residual water from the aqueous continuous phase after the jetting and drying reduces the curing speed of cationically curable chemistry.

Further objects and advantages of the invention will become apparent from the description hereinafter.

BRIEF DESCRIPTION OF THE DRAWINGS

FIG. 1 shows an aqueous UV free radical curable inkjet ink (1) containing a liquid phase A dispersed in a continuous liquid phase B (2) by a polymeric dispersant (3) wherein the liquid phase A contains a photoinitiator (6), a colour pigment (5), and one or more polymerizable compounds (4).

DETAILED DESCRIPTION OF THE PREFERRED EMBODIMENTS

Definitions

The term "monofunctional polymerizable compound" means that the polymerizable compound includes one polymerizable group.

The term "difunctional polymerizable compound" means that the polymerizable compound includes two polymerizable groups.

The term "polyfunctional polymerizable compound" means that the polymerizable compound includes more than two polymerizable groups.

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethyl-propyl and 2-methyl-butyl, etc.

Unless otherwise specified a substituted or unsubstituted alkyl group is preferably a $C_1$ to $C_6$-alkyl group.

Unless otherwise specified a substituted or unsubstituted alkenyl group is preferably a $C_1$ to $C_6$-alkenyl group.

Unless otherwise specified a substituted or unsubstituted alkynyl group is preferably a $C_1$ to $C_6$-alkynyl group.

Unless otherwise specified a substituted or unsubstituted aralkyl group is preferably a phenyl or naphthyl group including one, two, three or more $C_1$ to $C_6$-alkyl groups.

Unless otherwise specified a substituted or unsubstituted alkaryl group is preferably a $C_7$ to $C_{20}$-alkyl group including a phenyl group or naphthyl group.

Unless otherwise specified a substituted or unsubstituted aryl group is preferably a phenyl group or naphthyl group Unless otherwise specified a substituted or unsubstituted heteroaryl group is preferably a five- or six-membered ring substituted by one, two or three oxygen atoms, nitrogen atoms, sulphur atoms, selenium atoms or combinations thereof.

The term "substituted", in e.g. substituted alkyl group means that the alkyl group may be substituted by other atoms than the atoms normally present in such a group, i.e. carbon and hydrogen. For example, a substituted alkyl group may include a halogen atom or a thiol group. An unsubstituted alkyl group contains only carbon and hydrogen atoms Unless otherwise specified a substituted alkyl group, a substituted alkenyl group, a substituted alkynyl group, a substituted aralkyl group, a substituted alkaryl group, a substituted aryl and a substituted heteroaryl group are preferably substituted by one or more constituents selected from the group consisting of methyl, ethyl, n-propyl, isopropyl, n-butyl, isobutyl and tertiary-butyl, ester, amide, ether, thio-ether, ketone, aldehyde, sulfoxide, sulfone, sulfonate ester, sulphonamide, —Cl, —Br, —I, —OH, —SH, —CN and —NO$_2$.

Aqueous UV Curable Inkjet Inks

An aqueous UV free radical curable inkjet ink (1) according to a preferred embodiment of the invention contains a liquid phase A dispersed in a continuous liquid phase B (2) by a polymeric dispersant (3), wherein the liquid phase A contains at least a photoinitiator (6), a colour pigment (5), and one or more polymerizable compounds (4); and wherein the continuous liquid phase B contains water and optionally one or more organic solvents.

The aqueous UV free radical curable inkjet ink (1) according to the invention is a two-phase system wherein both phases are liquid. Such a system is sometimes also referred to as an emulsion, wherein the emulsion is stabilized by an emulsifier. Normally surfactants are used as emulsifier for stabilizing an emulsion by increasing its kinetic stability. In the present invention a polymeric dispersant is used as emulsifier. The polymeric dispersant disperses the UV curable liquid phase A containing a colour pigment in the aqueous continuous liquid phase B.

For UV curing the aqueous UV curable inkjet ink, a photoinitiator is present in the aqueous UV curable inkjet ink. For maximizing low migration properties and minimizing skin sensitivity of the jetted ink layer, the photoinitiator is preferably a polymeric or a polymerizable photoinitiator. In a more preferred embodiment, the photoinitiator is a polymeric photoinitiator, because a polymeric photoinitiator is usually less mobile than a polymerizable photoinitiator.

In a preferred embodiment, the aqueous UV free radical curable inkjet ink according to the invention is part of an aqueous UV free radical curable inkjet ink set, more preferably part of an aqueous UV free radical curable inkjet ink set including a plurality of inkjet inks according to the invention. The aqueous UV free radical curable inkjet ink set preferably includes at least a cyan aqueous UV curable inkjet ink, a magenta or red aqueous UV curable inkjet ink, a yellow aqueous UV free radical curable inkjet ink and a black aqueous UV curable inkjet ink.

The UV curable CMYK-inkjet ink set or CRYK-inkjet ink set may also be extended with extra inks such as green, blue, brown, violet and/or orange to further enlarge the colour gamut of the image. The UV free radical curable inkjet ink set may also be extended by the combination of one or more full density inkjet inks with light density inkjet inks. The combination of dark and light colour inks and/or black and grey inks improved the image quality by a lowered graininess.

The UV curable ink set may also include one or more spot colours, preferably one or more corporate colours, such as e.g. the red colour of CocaCola™.

The curable inkjet ink set preferably also includes a white aqueous UV curable inkjet ink.

Alternatively a non-CMYK or non-CRYK UV curable ink set may be composed, for example, an UV curable inkjet inkset containing a white UV free radical curable inkjet ink and/or a black UV free radical curable inkjet ink in combination with a red spot colour UV curable inkjet ink, e.g. of CocaCola™.

The viscosity of an aqueous UV free radical curable inkjet ink used in the invention is preferably smaller than 100 mPa·s at 25° C. and at a shear rate of 90 s$^{-1}$, more preferably between 1 and 50 mPa·s at 25° C. and at a shear rate of 90 s$^{-1}$.

The surface tension of an inkjet ink used in the invention is preferably in the range of 17 mN/m to 40 mN/m at 25° C., more preferably in the range of 18 mN/m to 34 mN/m at 25° C. The inkjet ink may also contain at least one surfactant for obtaining good spreading characteristics on a substrate. An aqueous inkjet ink with a surface tension smaller than 17 mN/m at 25° C. usually has to include a high amount of surfactant, which may cause problems of foaming. A surface tension greater than 40 mN/m at 25° C. often leads to insufficient spreading of the ink on a plastic foil.

A preferred aqueous UV free radical curable inkjet ink according to the present invention includes less than 30 wt %, more preferably 5 to 28 wt % of the UV curable liquid phase A based on the total weight of the aqueous UV curable inkjet ink.

The aqueous UV free radical curable inkjet ink preferably has a pH higher than 7.0, more preferably a pH in the range of 8.0 to 10.0.

Dispersed Liquid Phase A

The dispersed liquid phase A is UV curable and, in addition to a colorant, thus contains at least a photoinitiator and a polymerizable compound.

The dispersed liquid phase A preferably has a viscosity between 10 and 250 mPa·s, more preferably between 15 and 200 mPa·s and most preferably between 20 and 100 mPa·s at 25° C. and a shear rate of 90 s$^{-1}$.

Photoinitiators

For UV curing the aqueous UV curable inkjet ink, a photoinitiator is present in the aqueous UV curable inkjet ink.

For enabling low migration properties and minimizing skin sensitivity of the jetted ink layer, the photoinitiator is preferably a polymeric or a polymerizable photoinitiator. In a more preferred embodiment, the photoinitiator is a polymeric photoinitiator, since a polymeric photoinitiator usually has a much lower mobility than a polymerizable photoinitiator.

For improving storage stability, preferably the dispersed liquid phase A contains no thermal initiator, such as azobisisobutyronitrile (AIBN), benzoperoxide (BPO), tert-butyl hydroperoxide (TBHP) and tert-butyl perbenzoate (GYHB).

A single photoinitiator may be used, however for maximizing absorption of UV light during UV curing preferably a photoinitiating system is used.

The photoinitiator is preferably a Norrish Type I or II photoinitiator. The photoinitiator or photoinitiating system preferably consists of one or more free radical photoinitiators, optionally completed by co-initiators or polymerization synergists.

Two types of free radical photoinitiators can be distinguished and used in the inkjet inks of the present invention. A Norrish Type I initiator is an initiator which cleaves after excitation, yielding the initiating radical immediately. A Norrish type II-initiator is a photoinitiator which is activated by actinic radiation and forms free radicals by hydrogen abstraction from a second compound that becomes the actual initiating free radical. This second compound is called a polymerization synergist or co-initiator. Both type I and type II photoinitiators can be used in the present invention, alone or in combination.

Suitable photo-initiators are disclosed in CRIVELLO, J. V., et al. VOLUME III: Photoinitiators for Free Radical Cationic. 2nd edition. Edited by BRADLEY, G. London, UK: John Wiley and Sons Ltd, 1998. p. 287-294.

Specific examples of photo-initiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis (2,6-dimethylbenzoyl)-2,4, 4-trimethylpentylphosphine oxide, 2,4,6-trimethylbenzoyldiphenylphosphine oxide, 2-methyl-1-[4-(methylthio) phenyl]-2-morpholinopropan-1-one, 2,2-dimethoxy-1, 2-diphenylethan-1-one or 5,7-diiodo-3-butoxy-6-fluorone.

Suitable commercial photo-initiators include Irgacure™ 184, Irgacure™ 500, Irgacure™ 907, Irgacure™ 369, Irgacure™ 1700, Irgacure™ 651, Irgacure™ 819, Irgacure™ 1000, Irgacure™ 1300, Irgacure™ 1870, Darocur™ 1173, Darocur™ 2959, Darocur™ 4265 and Darocur™ ITX available from CIBA SPECIALTY CHEMICALS, Lucerin™ TPO available from BASF AG, Esacure™ KT046, Esacure™ KIP150, Esacure™ KT37 and Esacure™ EDB available from LAMBERTI, H-Nu™ 470 and H-Nu™ 470X available from SPECTRA GROUP Ltd.

For certain applications such as food packaging, the photoinitiator is preferably a so-called diffusion hindered photoinitiator. A diffusion hindered photoinitiator is a photoinitiator which exhibits a much lower mobility in a cured layer of the aqueous UV free radical curable inkjet ink than a monofunctional photoinitiator, such as benzophenone. Several methods can be used to lower the mobility of the photoinitiator. One way is to increase the molecular weight of the photoinitiator so that the diffusion speed is reduced, e.g. polymeric photoinitiators. Another way is to increase its reactivity so that it is built into the polymerizing network, e.g. multifunctional photoinitiators (having 2, 3 or more photoinitiating groups) and polymerizable photoinitiators. The diffusion hindered photoinitiator is preferably selected from the group consisting of multifunctional photoinitiators, oligomeric photoinitiators, polymeric photoinitiators and polymerizable photoinitiators. Most preferably the diffusion hindered photoinitiator is a polymerizable initiator or a polymeric photoinitiator.

Suitable diffusion hindered photoinitiators are also those disclosed in EP 2053101 A (AGFA) in paragraphs [0074] and [0075] for difunctional and multifunctional photoinitiators, in paragraphs [0077] to [0080] for polymeric photoinitiators and in paragraphs [0081] to [0083] for polymerizable photoinitiators.

Other preferred polymerizable photoinitiators are those disclosed in EP 2065362 A (AGFA) and EP 2161264 A (AGFA), incorporated herein by reference.

In order to increase the photosensitivity further, the free radical curable inkjet ink may additionally contain co-initiators. Suitable examples of co-initiators can be categorized in three groups:
(1) tertiary aliphatic amines such as methyldiethanolamine, dimethylethanolamine, triethanolamine, triethylamine and N-methylmorpholine;
(2) aromatic amines such as amylparadimethylaminobenzoate, 2-n-butoxyethyl-4-(dimethylamino) benzoate, 2-(dimethylamino)ethylbenzoate, ethyl-4-(dimethylamino)benzoate, and 2-ethylhexyl-4-(dimethylamino)benzoate; and
(3) (meth)acrylated amines such as dialkylamino alkyl (meth)acrylates (e.g., diethylaminoethylacrylate) or N-morpholinoalkyl-(meth)acrylates (e.g., N-morpholinoethylacrylate).

The preferred co-initiators are aminobenzoates.

The one or more co-initiators included into the aqueous UV free radical curable inkjet ink are preferably diffusion hindered co-initiators for safety reasons. A diffusion hindered co-initiator is preferably selected from the group consisting of non-polymeric di- or multifunctional co-initiators, oligomeric or polymeric co-initiators and polymerizable co-initiators. More preferably the diffusion hindered co-initiator is selected from the group consisting of polymeric co-initiators and polymerizable co-initiators.

For applications such a textiles where skin sensitization and skin irritation is to be avoided, preferably polymerizable photoinitiators are used that include one or more polymerizable groups differing from (meth)acrylate groups. Preferred polymerizable photoinitiators include an alkynyl group and/or a vinylcarbonate group as polymerizable group. Preferred polymerizable photoinitiators are those disclosed in WO 2015/031927 (DURST), especially those disclosed in Tables 1 to 5.

Particularly preferred are photoinitiators including an alkynyl group and/or a vinylcarbonate group as polymerizable group and including a thioxanthone group or an acylphosphine oxide group, as these polymerizable photoinitiators allow for UV curing by UV LEDs, having a wavelength larger than 370 nm. Preferred polymerizable thioxanthone photoinitiators include the examples 21, 22, 23, 24, 25, 26 and 27 in Table 1; the examples 42, 43 and 53 in Table 2; the example 56 in Table 3; and the example 77, 78, 79, 80, 81 and 82 in Table 4 of WO 2015/031927 (DURST).

Preferred polymerizable acylphosphine oxide photoinitiators include the examples 97, 98, 99, 100, 101, 102, 103, 104, 105, 106, 107, 108, 109, 110, 111, 112, 114 disclosed in WO 2015/031927 (DURST).

For preventing bad odour, the most preferred acylphosphine oxide photoinitiators are those having a polymerizable group on each mesitaldehyde group of the acylphosphine oxide photoinitiator.

Particularly preferred acylphosphine oxide photoinitiators are the compounds 108, 109, 110, 111, 112, 113 and 114 disclosed in WO 2015/031927 (DURST).

A preferred amount of the one or more free radical photoinitiators is 0.1-15 wt %, more preferably 0.2-10 wt % of the total weight of the aqueous UV curable inkjet ink.

The aqueous UV free radical curable inkjet ink preferably comprises a co-initiator in an amount of 0.1 to 15 wt %, more preferably in an amount of 0.2 to 10 wt % of the total weight of the aqueous UV curable inkjet ink.

Polymerizable Compounds

Any free radical polymerizable compound commonly known in the art may be employed. A combination of monomers, oligomers and/or polymers may be used. The monomers, oligomers and/or polymers may possess different degrees of functionality, and a mixture including combinations of mono-, di-, tri- and higher functionality monomers, oligomers and/or polymers may be used.

The free radical polymerizable compound in the inkjet ink maybe monofunctional, difunctional and/or polyfunctional (meth)acrylate monomers, oligomers or prepolymers, more preferably monofunctional, difunctional and/or polyfunctional acrylate monomers, oligomers or prepolymers because of their higher reactivity, such as isoamyl acrylate, stearyl acrylate, lauryl acrylate, octyl acrylate, decyl acrylate, isoamylstyl acrylate, isostearyl acrylate, 2-ethylhexyl-diglycol acrylate, 2-hydroxybutyl acrylate, 2-acryloyloxyethylhexahydrophthalic acid, butoxyethyl acrylate, ethoxydiethylene glycol acrylate, methoxydiethylene glycol acrylate, methoxypolyethylene glycol acrylate, methoxypropylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, vinyl ether acrylate, 2-acryloyloxyethylsuccinic acid, 2-acryloyxyethylphthalic acid, 2-acryloxyethyl-2-hydroxyethyl-phthalic acid, lactone modified flexible acrylate, and t-butylcyclohexyl acrylate, triethylene glycol diacrylate, tetraethylene glycol diacrylate, polyethylene glycol diacrylate, dipropylene glycol diacrylate, tripropylene glycol diacrylate, polypropylene glycol diacrylate, 1,4-butanediol diacrylate, 1,6-hexanediol diacrylate, 1,9-nonanediol diacrylate, neopentyl glycol diacrylate, dimethyloltricyclodecane diacrylate, bisphenol A EO (ethylene oxide) adduct diacrylate, bisphenol A PO (propylene oxide) adduct diacrylate, hydroxypivalate neopentyl glycol diacrylate, propoxylated neopentyl glycol diacrylate, alkoxylated dimethyloltricyclodecane diacrylate and polytetramethylene glycol diacrylate, trimethylolpropane triacrylate, EO modified trimethylolpropane triacrylate, tri (propylene glycol) triacrylate, caprolactone modified trimethylolpropane triacrylate, pentaerythritol triacrylate, pentaerithritol tetraacrylate, pentaerythritolethoxy tetraacrylate, dipentaerythritol hexaacrylate, ditrimethylolpropane tetraacrylate, glycerinpropoxy triacrylate, and caprolactam modified dipentaerythritol hexaacrylate, or an N-vinylamide such as, N-vinylcaprolactam or N-vinylformamide; or acrylamide or a substituted acrylamide, such as acryloylmorpholine.

Other suitable monofunctional acrylates include caprolactone acrylate, cyclic trimethylpropane formal acrylate, ethoxylated nonyl phenol acrylate, isodecyl acrylate, isooctyl acrylate, octyldecyl acrylate, alkoxylated phenol acrylate, tridecyl acrylate and alkoxylated cyclohexanone dimethanol diacrylate.

Other suitable difunctional acrylates include alkoxylated cyclohexanone dimethanol diacrylate, alkoxylated hexanediol diacrylate, dioxane glycol diacrylate, dioxane glycol diacrylate, cyclohexanone dimethanol diacrylate, diethylene glycol diacrylate and neopentyl glycol diacrylate.

Other suitable trifunctional acrylates include propoxylated glycerine triacrylate and ethoxylated or propoxylated trimethylolpropane triacrylate.

Other higher functional acrylates include ditrimethylolpropane tetraacrylate, dipentaerythritol pentaacrylate, ethoxylated pentaeryhtitol tetraacrylate, methoxylated glycol acrylates and acrylate esters.

A preferred polymerizable compound is a vinylether acrylate, more preferably a compound represented by Formula (I):

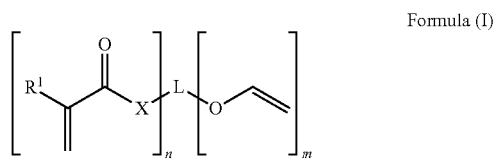

Formula (I)

wherein, $R^1$ represents hydrogen, or a substituted or unsubstituted alkyl group, L represents a linking group comprising at least one carbon atom, X represents O, S or $NR^2$ wherein $R^2$ has the same meaning as $R^1$; when X=$NR^2$, L and $R^2$ may form together a ring system, and n and m independently represent a value from 1 to 5.

In a preferred embodiment, the compound according to Formula (I) has $R^1$ representing hydrogen, X representing O, and n representing a value of 1. The value of m is preferably 1, 2 or 3. L preferably comprises 2, 3 or 4 carbon atoms.

Preferred vinylether acrylates are those disclosed in U.S. Pat. No. 6,310,115 (AGFA), incorporated herein by reference. Particularly preferred compounds are 2-(2-vinyloxyethoxy)ethyl (meth)acrylate, most preferably the compound is 2-(2-vinyloxyethoxy)ethyl acrylate.

Other suitable vinylether (meth)acrylates are those disclosed in columns 3 and 4 of U.S. 67/679,890 B (NIPPON SHOKUBAI).

The vinylether acrylates can be prepared according to standard synthetic methods known to those skilled in the art of organic synthesis. Suitable synthetic methods are disclosed in U.S. Pat. No. 6,310,115 (AGFA) and U.S. 67/679, 890 B (NIPPON SHOKUBAI).

Furthermore, methacrylates corresponding to the abovementioned acrylates may be used with these acrylates. Of the methacrylates, methoxypolyethylene glycol methacrylate, methoxytriethylene glycol methacrylate, hydroxyethyl methacrylate, phenoxyethyl methacrylate, cyclohexyl methacrylate, tetraethylene glycol dimethacrylate, and polyethylene glycol dimethacrylate are preferred due to their relatively high sensitivity and higher adhesion to an ink-receiver surface.

Furthermore, the inkjet ink may also contain polymerizable oligomers. Examples of these polymerizable oligomers include epoxy acrylates, aliphatic urethane acrylates, aromatic urethane acrylates, polyester acrylates, and straight-chained acrylic oligomers.

Suitable examples of styrene compounds are styrene, p-methylstyrene, p-methoxystyrene, b-methylstyrene, p-methyl-b-methylstyrene, a-methylstyrene and p-methoxy-b-methylstyrene.

Suitable examples of vinylnaphthalene compounds are 1-vinylnaphthalene, a-methyl-1-vinylnaphthalene, b-methyl-1-vinylnaphthalene, 4-methyl-1-vinylnaphthalene and 4-methoxy-1-vinylnaphthalene.

Suitable examples of N-vinyl heterocyclic compounds are N-vinylcarbazole, N-vinylpyrrolidone, N-vinylindole, N-vinylpyrrole, N-vinylphenothiazine, N-vinylacetoanilide, N-vinylethylacetoamide, N-vinylsuccinimide, N-vinylphthalimide, N-vinylcaprolactam and N-vinylimidazole.

In a preferred embodiment, the polymerizable compound in the inkjet ink includes at least one monomer selected from the group consisting of N-vinyl caprolactam, phenoxyethyl acrylate, dipropyleneglycoldiacrylate, ethoxylated trimethylolpropane triacrylate, pentaerythritol tetraacrylate, and cyclic trimethylolpropane formal acrylate.

Examples of vinyl ethers having at least one vinyl ether group include ethyl vinyl ether, n-butyl vinyl ether, isobutyl vinyl ether, octadecyl vinyl ether, cyclohexyl vinyl ether, butanediol divinyl ether, hydroxyl butyl vinyl ether, cyclohexane dimethanol monovinyl ether, phenyl vinyl ether, p-methylphenyl vinyl ether, p-methoxyphenyl vinyl ether, a-methylphenyl vinyl ether, b-methylisobutyl vinyl ether and b-chloroisobutyl vinyl ether, diethyleneglycol divinyl ether, triethylene glycol divinyl ether, n-propyl vinyl ether, isopropyl vinyl ether, dodecyl vinyl ether, diethylene glycol monovinyl ether, cyclohexanedimethanol divinyl ether, 4-(vinyloxy)butyl benzoate, bis[4-(vinyl oxy)butyl]adipate, bis[4-(vinyl oxy)butyl]succinate, 4-(vinyloxy methyl)cyclohexylmethyl benzoate, bis[4-(vinyloxy)butyl]isophthalate, bis[4-(vinyloxymethyl)cyclohexylmethyl]glutarate, tris[4-(vinyloxy)butyl]trimellitate, 4-(vinyloxy)butyl steatite, bis [4-(vinyloxy)butyl]hexanediylbiscarbamate, bis[4-(vinyloxy)methyl]cyclohexyl]methyl]terephthalate, bis[4-(vinyloxy)methyl]cyclohexyl]methyl]isophthalate, bis[4-(vinyloxy)butyl](4-methyl-1,3-phenylene)-biscarbamate, bis[4-vinyloxy)butyl](methylenedi-4,1-phenylene) biscarbamate and 3-amino-1-propanol vinyl ether.

Suitable monomers and oligomers are preferably selected from a group comprising or consisting of acrylates, methacrylates, vinyls, acrylamides, methacrylamides, vinyl carbonates, vinyl ethers, vinyl esters, vinyl carbamates, allyl ethers, allyl esters and their corresponding alkyne compounds.

More preferably the monomers and oligomers are selected from a group comprising or consisting of vinyls, acrylamides, methacrylamides, vinyl carbonates, vinyl ethers, vinyl esters, vinyl carbamates, allyl ethers, allyl esters and their corresponding alkyne compounds.

Particularly preferred are polymerizable compounds including allyl ether groups, vinyl carbonate groups and alkyne groups. Synthesis of such functional monomers is disclosed in the relevant literature, for example in HURD, Charles D. Vinylation and the Formation of Acylals. *Journal Am. Chem. Soc.* 1956, vol. 78, no. 1, p. 104_106.; LOBELL, M., et al. Synthesis of hydroxycarboxylic acid vinyl esters. *MP Synthesis*. 1994, vol. 4, p. 375-377.; LEE, T. Y., et al. Synthesis, Initiation, and Polymerization of Photoinitiating Monomer. *Macromolecules*. 2005, vol. 38, no. 18, p. 7529-7531.; ATTA, A. M., et al. New vinyl ester resins based on rosin for coating applications. *React. Funct. Polym.* 2006, vol. 66, p. 1596-1608.; WO 01/00634 A (WRIGHT CHEM CORP); and ROHR, Markus, et al. Solvent-free ruthenium-catalysed vinylcarbamate synthesis from phenylacetylene and diethylamine in 'supercritical' carbon dioxide. *Green Chemistry*. 2001, vol. 3, p. 123-125.

Preferred compounds for the synthesis of the above functional monomers include ethylene glycols; propylene glycols; neopentylglycols; 1,1'-methylene-di (2-naphthol); 1,1,1-tris (4-hydroxyphenyl) ethane; 1,14-tetradecanediol; 1, 2,4-benzenetriol; 1,2-benzenedimethanol; 1,2-decanediol; 1,2-pentanediol; 1,2-tetradecanediol; 1,3-dioxane-5,5-dimethanol; 1,3-propanediol; 1,4-bis (2-hydroxyisopropyl) benzene; 1, 5-hexadiene-3,4-diol; 1,6-dihydroxy naphthalene; 1,6-hexane diol; 1-(2-nitrophenyl)-1,2-ethanediol; 1-(benzyloxymethyl) tri (ethylene glycol); 1-[N,N-bis (2-hydroxyethyl)amino]-2-propanol; 2,2'-(o-phenylenedioxy) diethanol; 2,2' biphenyldimethanol; 2,2'-bipyridine-3,3'-diol; 2,2, 3,3,4,4,5, 5-octafluoro-1, 6-hexanediol; 2,2,4-trimethyl-1,3-pentanediol; 2,2-bis (bromomethyl)-1,3 propanediol; 2,2-bis (hydroxymethyl) butyric acid; 2,3,5,6-tetramethyl-p-xylene-a,a'-diol; 2,3-dibromo-1,4-butanediol; 2,3-dichloro-5,8-dihydroxy-1,4-naphthoquinone; 2,4-dimethyl-2,4-pentanediol; 2,5-dibromohydroquinone; 2,5-dihydroxy-1,4-benzoquinone; 2,5-dimethylresorcinol; 2,6-dihydroxy-4-methyl-3-pyridinecarbonitrile; 2,7-dimethyl-3,5-octadiyne-2,7-diol; 2-(bromomethyl)-2-(hydroxymethyl)-1, 3-propanediol; 2-benzyloxy-1,3-propanediol; 2-hydroxyethyl disulfide; 2-hydroxymethyl-1,3-propanediol; 2-methyl-1,3-propanediol; 2-methylene-1, 3-propanediol; 2-nitroresorcinol; 2-phenyl-1,2-propanediol; 3',5'-dihydroxyacetophenone; 3,3'-(ethylenedioxy) diphenol; 3,3,3',3'-tetramethyl-1,1'-spirobiindane-5,5', 6,6'-tetraol; 3,3-dimethyl-1,2-butanediol, 3-(4-methoxyphenoxy)-1,2-propanediol; 3-bromo-1,2-propanediol; 3-cyclohexene-1,1-dimethanol; 3-ethoxy-1,2-propanediol; 3-fluorocatechol; 3-hexyne-2,5-diol; 3-methoxy-1,2-propanediol; 3-methyl-1,3,5-pentanetriol; 3-morpholine-1,2-propanediol; 3-phenoxy-1,2-propanediol; 3-piperidin-1,2-propanediol; 4,4'-dihydroxybenzophenone; 4,4'-isopropylidene-bis[2-(2,6-dibromophenoxy) ethanol]; 4,4'-isopropylidenedicyclohexanol; 4,6-dinitropyrogallol; 4-amino-4-(3-hydroxypropyl)-1,7-heptanediol; 4-bromo-3,5-dihydroxybenzoic acid; 4-tert-butylcalix[4]arene; 5-chloro-2, 3-pyridinediol; 7,8-dihydroxy-6-methoxycoumarin; 7-octene-1,2-diol, anthrarufin; bis (2-hydroxyethyl) terephthalate; chlorohydroquinon; di(trimethylolpropane),diethyl 2,5-dihydroxyterephthalate; diethyl bis (hydroxymethyl) malonate; hydrobenzoin; hydroquinone-bis (2-hydroxyethyl) ether; methyl 3,4,5-trihydroxybenzoate; N,N,N',N'-tetrakis (2-hydroxypropyl) ethylenediamine; nitromethantrispropanol; pentaerythritol; tetrafluorohydroquinone; triisopropanolamine; 1,3,5-cyclohexanetriol; 1, 2-cyclopentanediol; tert-butylhydroquinone; 1,2-cyclohexanediol; 1,4-dioxane-2,3-diol; 2,3-dibromo-2-butene-1,4-diol; trans-p-menth-6-ene-2,8-diol; 2,2'-biphenol, 3,3', 5,5'-tetrabromobisphenol A; 4,4'-(1,3-phenylenediiso- propylidene) bisphenol; 4,4'-(1,4-phenylene diisopropylidene) bisphenol; 4,4'-(1-phenylethylidene) bisphenol; 4,4'-(9-fluorenylidene) diphenol; 4,4'-(hexafluoroisopropylidene) diphenol; 4,4'-cyclohexylidene bisphenol; 4,4'-ethylidenebisphenol; 4,4'-isopropylidenebis (2,6-dimethylphenol); 4,4'-dihydroxybiphenyl; 4,4'-methylenebis (2,6-di-tert-butylphenol); 4,4'-sulfonylbis (2-methylphenol); 4,4'-sulfonyldiphenol; 4,4'- thiodiphenol; bis[4-(2-hydroxyethoxy) phenyl] sulfone; bisphenol A; ethoxylated bisphenol A; propoxylated bisphenol A; bisphenol C; 1,2,4,5 benzentetracarboxamide; 1,2-diaminocyclohexane; 1,3-cyclohexanebis(methylamine); 1,4-diaminoanthraquinone; 1, 5-diamino-2-methylpentane; 1,9-diaminononane; 2,2'-(ethylenedioxy) bis(ethylamine); 2,2-dimethyl-1, 3-propanediamine; 2,3,5, 6-tetramethyl-p-phenylenediamine; 2,4,6-trimethyl-m-phenylenediamine; 2,4,8, 10-tetraoxaspiro [5.5] undecane 3,9-dipropanamine; 2,4-diaminotoluene; 2,5-dichloro-p-phenylenediamine; 2,5-dimethyl-1,4-phenylenediamine; 2,6-diaminopurine; 2,6-diaminotoluene; 2-aminophenyl disulfide; 3,3'-methylenedianiline; 3,4'-oxydianiline; 3, 4-diaminobenzophenone; 4,4'-(1,1'-biphenyl-4,4'-diyldioxy) dianiline; 4,4'-(1,3-phenylenediisopropylidene) bisaniline; 4,4'(1,3-phenylenedioxy) dianiline; 4,4'-(1,4-phenylenediisopropylidene) bisaniline; 4,4'-(4,4'-isopropylidene dendiphenyl-1,1'-diyldioxy)dianiline; 4,4'-(hexafluoroisopropylidene) bis (p-phenylene-oxy) dianiline; 4,4'-(hexafluoroisopropylidene) dianiline; 4,4'-diaminobenzophenone; 4,4'-diaminooctafluorobiphenyl; 4,4'-methylenebis(cyclohexylamine); 4,4'-diaminobenzanilide; 4,4'-methylene-bis (2-chloroaniline); 4,4'-methylenebis (2,6-diethylaniline); 4,4'-methylenebis (2,6-dimethylaniline); 4,7,10-trioxa-1,13-tridecanediamine; 4,9-dioxa-1,12-dodecanediamine; 4-aminophenyl, 4-chloro-o-phenylenediamine; 5,5'-(hexafluoroisopropylidene) di-o-toluidine; 6-chloro-3,5-diamino-2-pyrazinecarboxamide; DYTEK®-EP-diamine; poly(1,4-butanediol) bis (4-aminobenzoate); tris (2-aminoethyl) amine; p-xylylenediamine; 1,4,8,11-tetraazacy-5,7-dione; 1,4,8,12-tetraazacyclopentadecane; 1,5,9 triazacyclododecane; N,N'-diisopropyl-1,3-propanediamine; N,N'-diisopropylethylenediamine; N,N'-diphenyl-p-phenylenediamine; N,N'-diethyl-2-butene-1,4-diamine; N,N'-dimethyl-1,3-propanediamine; 1-[bis[3-(dimethylamino)propyl]amino]-2-propanol; 2-[2-(dimethylamino) ethoxy] ethanol; 1,1-cyclohexanediacetic acid, 1,2,3,4-butane tetracarboxylic acid; 1,2,3-triazole-4,5-dicarboxylic acid; 1,3,5-cyclohexanetricarboxylic; 1,3 acetonedicarboxylic; 1,3-adamantanediacetic acid; 1,3-cyclohexane dicarboxylic acid; 1,4-naphthalene dicarboxylic acid; 1,4-phenylenedipropionic, 2,2'-bipyridine-4,4'-dicarboxylic acid; 2,2'-Iminodibenzoesäure; 2,3-dirombutandicarboxylic acid; 2,5-dihydroxyterephthalic acid, 2,6-dimethyl-3,5-pyridinedicarboxylic acid; 2,6-naphthalene dicarboxylic acid; 2-(2-methoxyethoxy) acetic acid, 2-bromoterephthalic acid; 2-methoxyisophthalic acid; 2-[2-(2-methoxyethoxy) ethoxy] acetic acid; 3-fluorophthalic acid; 3-phenylglutaric acid; 3-thiophenmalonic acid; 4,4'-oxybis (benzoic acid), 4,4' sulfonyldibenzoic acid, 4,5-dichlorophthalic acid; 4-methylphthalic acid; 5-(octadecyloxy) isophthalic acid; 5-tert butylisophthalic acid; 6-methyl-2,3-dicarboxylic acid; 1,7-heptanedicarboxylic acid; benzyl malonic acid; biphenyl-4,4'-dicarboxylic acid; bis (carboxymethyl) trithiocarbonate; butylmalonic acid; chlorobutandiacid; cyclohexylbutandiacid; dibromomaleinic acid; diethylmalonic acid; dodecandiacid; ethylmalonic acid; hexadecanediacid; 2-methyl-2-butenediacid; perfluoroglutaric acid; phenylmalonic acid; terephthalic acid; tetrafluorophthalic acid; undecanediacid, p-terphenyl 4,4"dicarboxylic acid; 1,6-hexanediacid; etc. can be used.

Preferred polymerizable oligomers and polymers are urethanes, polyesters, polyethers, polycarbonates, poly-carbamates, polyureas and straight-chain oligomers having the following polymerizable groups: acrylate, methacrylate, vinyl, acrylamide, methacrylamide, vinyl carbonate, vinyl ether, vinylester-vinyl carbamate groups, as well as their corresponding alkyne compounds.

Particularly preferred monomers are selected from the group consisting of di- or oligofunctional allylethers, di- or oligofunctional allyl esters, di- or oligofunctional vinyl ethers, di- or oligofunctional vinyl esters and di- or oligofunctional norbornene derivatives. Typical allyl ethers can be selected from pentaerythritol tetraallyl ether, glycerol triallyl ether, 1,6-hexane diol diallyl ether, cyclohexane dimethanol diallyl ether, trimethylolpropane triallyl ether, dipentaerythritol hexaallyl ether and ethoxylated and propoxylated derivatives thereof. Typical vinylethers can be selected from pentaerythritol tetravinyl ether, glycerol trivinyl ether, 1,6-hexane diol divinyl ether, cyclohexane dimethanol divinyl ether, trimethylolpropane trivinyl ether, dipentaerythritol hexavinyl ether and ethoxylated and propoxylated derivatives thereof. Typical allyl esters can be selected from adipic acid diallyl ester, terephtalic acid diallyl ester, trimellitic acid triallyl ester, pyromellitic acid tetraallyl ester, citric acid triallyl ester and glutaric acid diallyl ester. Typical vinyl esters can be selected from adipic acid divinyl ester, terephtalic acid divinyl ester, trimellitic acid trivinyl ester, pyromellitic acid tetravinyl ester, citric acid trivinyl ester and glutaric acid divinyl ester.

Thiol-yne chemistry has been described as an extension for thiol-ene chemistry to design crosslinked networks with a higher crosslinking density and glass transition temperature in comparison with thiol-ene based networks. The chemistry has recently been reviewed by Lowe et al. (Journal of Materials Chemistry, 20, 4745-4750 (2010)) and by Hoogenboom R. (Angew. Chem. Int. Ed. 49, 3415-3417 (2010)).

Optionally photochemically induced radical double addition of polyfunctional thiol compounds to di- or multifunctional alkynes is the basis of thiol-yne chemistry. In principle any di- or multifunctional alkyne, including polymeric alkynes, can be used in combination with any di- or polyfunctional thiol compound.

In a preferred embodiment, at least one of the alkyne functions in the di- or polyfunctional alkynes is represented by H—C≡C—*, where represents the covalent bond to the rest of the di- or polyfunctional alkyne.

In a more preferred embodiment, all of the alkyne groups in the di- or polyfunctional alkyne are represented by H—C≡C—*.

In an even more preferred embodiment, the alkyne functions in said di- or polyfunctional alkyne is selected from the group consisting of a propargyl ether, a propargyl ester, a propargyl urethane, a propargyl ureum, a propargyl carbonate, a propargyl amide, a propargyl thioether and a propargyl amine. In a further preferred embodiment, said alkyne group is selected from the group consisting of a propargyl ether, a propargyl ester and propargyl urethane, a propargyl ester and a propargyl urethane being particularly preferred.

Typical examples of di- and polyfunctional alkynes are given by Table 1 without being limited thereto.

TABLE 1
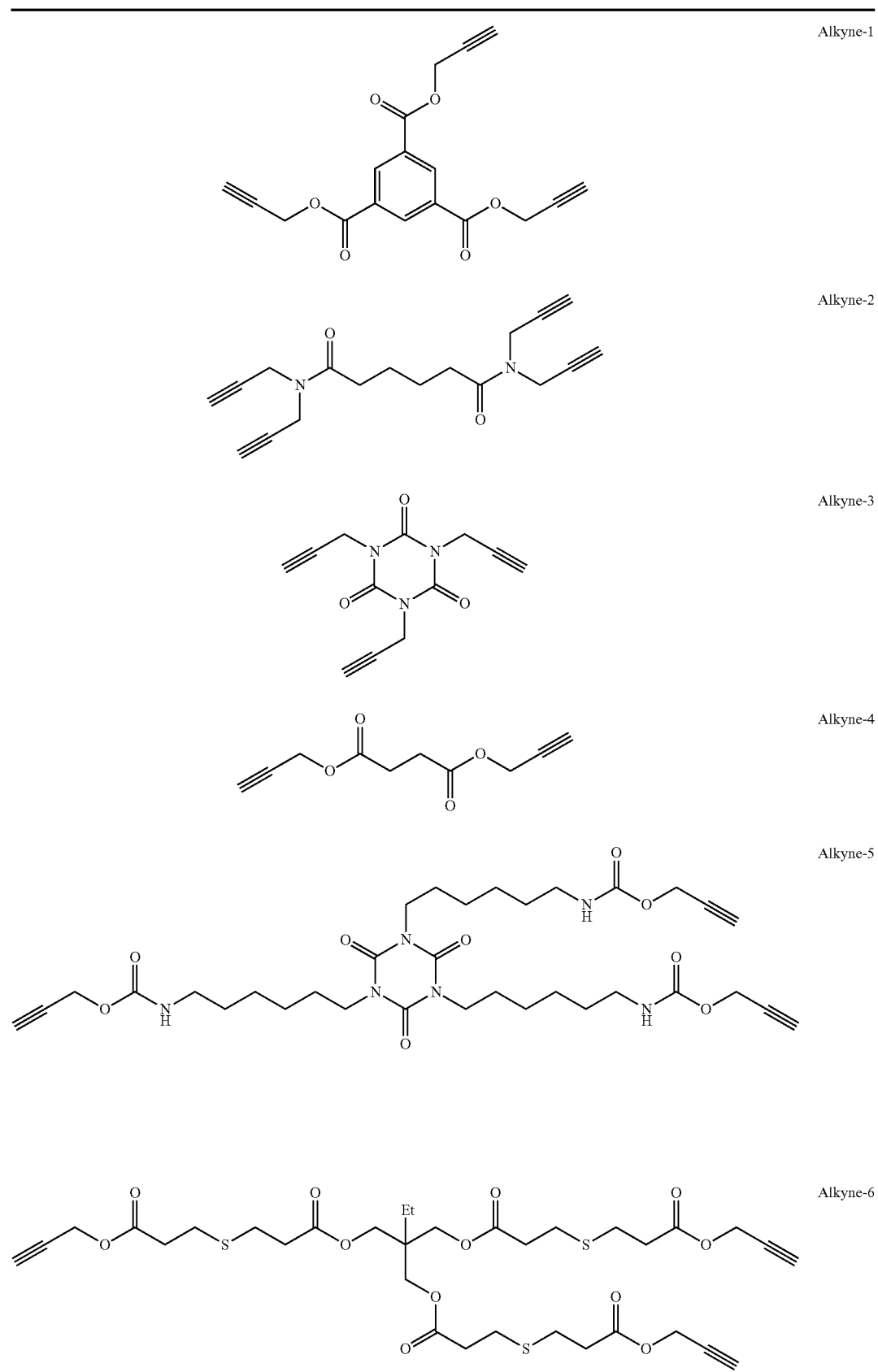

TABLE 1-continued
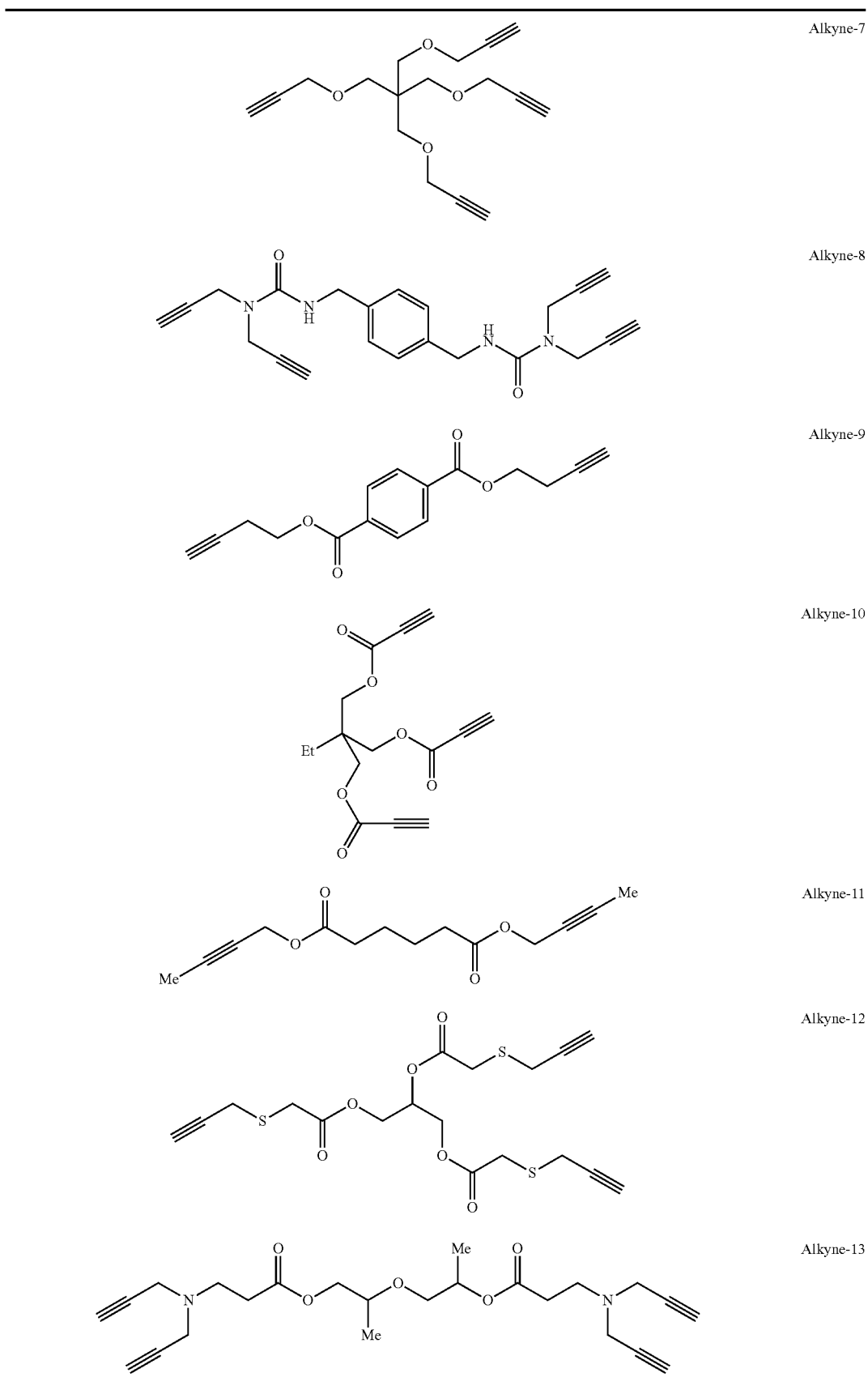

TABLE 1-continued

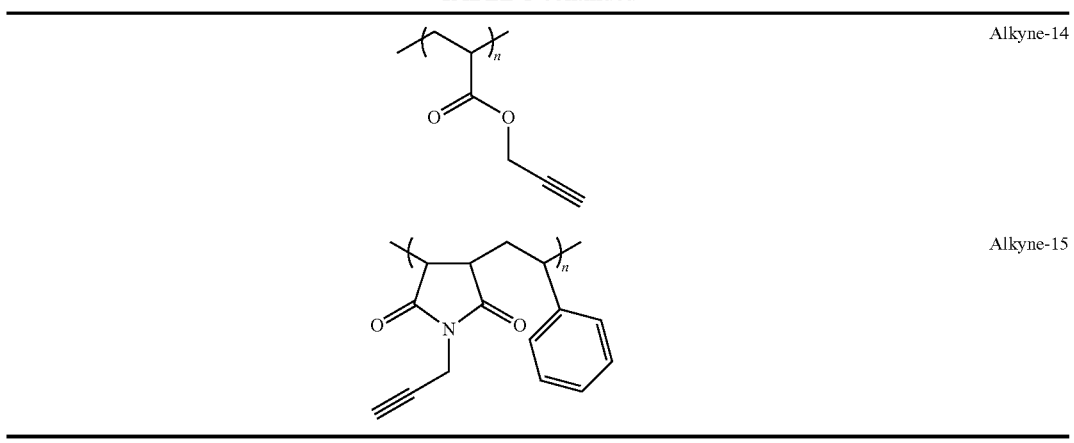

Alkyne-14

Alkyne-15

In a preferred embodiment, the amount of monofunctional polymerizable compounds present in the polymerizable composition of the ink is 0 to 15 wt % based on the total weight of the polymerizable composition. Most preferably the one or more polymerizable compounds (4) of the aqueous UV free radical curable inkjet ink according to the invention consist of difunctional and/or polyfunctional polymerizable compounds. When the amount of monofunctional polymerizable compounds is minimized then the migration limits for ink components are easily reached when printing on food packaging. Unlike with 100% solids UV curable inkjet inks, the flexibility of the printed substrate remained good.

The polymerizable compounds in the aqueous UV free radical curable inkjet ink preferably consist for 70 to 100 wt % of polymerizable compounds having an octanol-water partition coefficient at 25° C. expressed as $\log_{10}(K_{OW})$ higher than 0. The octanol-water partition coefficient $K_{OW}$ is a dimensionless concentration ratio of the solubility of a compound in octanol (a non-polar solvent) to its solubility in water (a polar solvent).

In a preferred embodiment, the aqueous UV curable inkjet ink includes 1 to 25% by weight of polymerizable compounds, more preferably 3 to 20% by weight and most preferably at least 5% by weight all based on the total weight of the aqueous UV free radical curable inkjet ink.

Thiol Compounds

In a preferred embodiment of the aqueous UV free radical curable inkjet, the liquid phase A includes a thiol compound including at least two thiol groups.

The thiol compound is advantageously used to execute so-called thiol-ene and/or thiol-yne click chemistry for enhancing the low migration properties further. Although thiol compounds are known to have an undesired smell, no repulsive odour could be observed, which in daily life could prevent a customer for buying a food packaging having such a cured printed layer on its outer surface.

The thiol-ene and thiol-yne click chemistry is known to the skilled person as illustrated by e.g. KADE, Matthew J., et al. The Power of Thiol-ene Chemistry. (A) *J. polym. sci., A, Polym. chem.* 2010, vol. 48, p. 743-750. and YAO, BiCheng, et al. Thiol-yne click polymerization. *Chinese Science Bulletin.* August 2013, vol. 58, no. 22, p. 2711-2718.

The advantages of this chemistry that it insensitive to oxygen inhibition, which allows to obtain a high polymerization degree resulting in low migration properties. It was also observed that residual water remaining in the dried ink layer of the aqueous UV free radical curable inkjet ink had no or minimal effect of the UV curing process of thiol-ene or thiol-yne chemistry.

Thiol-ene chemistry proceeds according to a step-growth mechanism which results in minimal shrinking. This effect is employed in the invention for enhancing adhesion to substrates, especially to non-absorbing substrates.

Furthermore on a PVC substrate it was found that a surface modification could be affected wherein the thiol compound was covalently bonded to the PVC surface, enhancing the adhesion even further as a non-bonded thiol group was available for reaction with a polymer, an oligomer or a monomer having ethylenically unsaturated polymerizable groups.

A combination of thiol molecules may also be used in the aqueous UV curable inkjet ink.

In a preferred embodiment, the thiol compound includes a thiol group which is converted to a thiolate group, such as a potassium thiolate group or a sodium thiolate group. Such a compound is capable of performing a surface modification of a PVC substrate at a temperature of 60° C., which is a temperature obtainable in the inkjet printer during drying when using e.g. infrared light, such as a NIR-dryer or a CIR-dryer. The thiolate group may also be formed in-situ by adjustment of the pH of the aqueous UV curable inkjet ink. The chemical reaction that occurs on the PVC substrate is as follows:

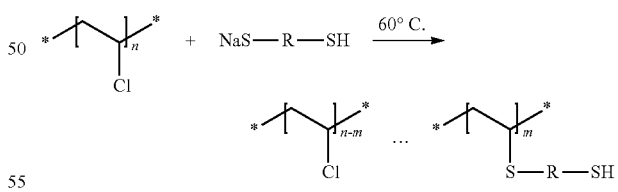

wherein R represents an optionally substituted alkylene group, an optionally substituted alkenylene group, an optionally substituted alkynylene group, an optionally substituted alkarylene group, an optionally substituted aralkylene group, an optionally substituted arylene or heteroarylene group, an ester containing aliphatic linking group, an ether containing aliphatic linking group and a silane containing aliphatic linking group or combinations thereof. The result is that a thiol compound covalently bonded to the PVC surface is available for reaction in a thiol-ene or a thiol-yne click chemistry.

The thiol compound may also be present as an oligomer or a polymer. Preferred thiol oligomers and polymers include urethanes, polyesters, polyethers, polycarbonates, poly-carbamates, polyureas and corresponding straight-chain oligomers.

In a preferred embodiment, the aqueous UV free radical curable inkjet ink includes thiol compounds and polymerizable compounds in an amount such that the ratio of "the number of thiol groups" over "the number of ethylenically unsaturated polymerizable groups and alkyne groups" is in the range of 0.25:1 to 4:1, preferably in the range of 0.5:1 to 2:1 and most preferably the ratio is about 1.

The thiol compound includes at least two thiol groups. Preferred thiol molecules include two to six thiol groups, preferably three to five thiol groups, and most preferably four thiol groups.

The thiol molecule is preferably a compound comprising an aliphatic thiol.

In a preferred embodiment, the thiol molecule is represented by Formula (I):

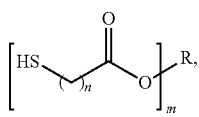

Formula (I)

wherein n represents an integer from 1 to 4; m represents an integer from 2 to 6; and R represents an m-valent linking group comprising at most 20 carbon atoms.

In a preferred embodiment n represents 1 or 2.
In a preferred embodiment m represents 3 or 4.
In a more preferred embodiment n represents 1 or 2 and m represents an integer from 2 to 6. In the most preferred embodiment n represents 1 or 2 and m represents 3 or 4.

In a preferred embodiment, the thiol compound has a molecular weight smaller than 1,000 Dalton, more preferably the thiol compound has a molecular weight smaller than 500 Dalton.

Particularly preferred primary thiol molecules include tetra(ethylene glycol) dithiol (CAS 2781-02-4), glykol di(3-mercaptopropionate) (CAS 22504-50-3), glyceryl dithioglycolate (CAS 63657-12-5), glycol dimercaptoacetate (CAS 123-81-9), trimethylolpropane trimercaptoacetate (CAS 10193-96-1), pentaerythritol tetramercaptoacetate (CAS 10193-99-4), glykol di(3-mercaptopropionate) (CAS 22504-50-3), trimethylolpropane tri(3-mercaptopropionate) (CAS 33007-83-9), pentaerythritol tetra(3-mercaptopropionate) (CAS 7575-23-7), dipentaerythritol hexa(3-mercaptopropionate) (CAS 25359-71-1), ethoxylated-trimethylolpropane tri-3-mercaptopropionate (CAS 345352-19-4), and tris[2-(3-mercaptopropionyloxy)ethyl]isocyanurate (CAS 36196-44-8).

The above and other thiol molecules are commercially available, e.g. as Thiocure™ grades from Bruno Bock Chemische Fabrik GmbH & Co. KG.

Suitable thiol molecules include 1,1,1-trimethylolpropane tris(3-mercaptopropyl)ether, 1,2,4-tris(2-mercaptoethyl)cyclohexane, tri(3-mercaptopropyl) trimetylolpropane and others disclosed by WO 2011/004255 A (KUROS BIOSURGERY).

It was found that thiol molecules having secondary thiol groups exhibited less odour than thiol molecules having only primary thiol groups. Hence, the thiol molecule preferably includes at least two secondary thiol groups, more preferably the thiol molecule includes two to six secondary thiol groups, preferably three to five secondary thiol groups, and most preferably four secondary thiol groups.

A particularly preferred thiol molecule having secondary thiol groups is pentaerythritol tetrakis (3-mercaptobutylate). The latter is available as Omnimer™ PE1 from IGM RESINS and Karenz MT™ PE1 from SHOWA DENKO.

For minimizing odour of an aqueous UV curable inkjet ink, especially after UV curing, the molar ratio of thiol molecules having primary thiol groups over thiol compounds having at least one secondary thiol group is preferably 0 to 4, more preferably the molar ratio is 0, meaning that the thiol molecules in the aqueous UV free radical curable inkjet ink consist of thiol molecules containing at least one secondary thiol group. For calculating the molar ratio, a thiol molecule having primary thiol groups is considered to have only primary thiol groups, while thiol molecules containing at least one secondary thiol group may also include primary thiol groups.

In the most preferred embodiment, the thiol molecules consist of thiol molecules containing only secondary thiol groups.

For improving mechanical performance and limited potential for water uptake, leachables and degradation, the thiol molecules are preferably ester-free thiol molecules.

Particularly preferred ester-free thiol molecules are silane based thiol molecules and siloxane based thiol molecules. Such compounds can easily be synthesized by reacting thioacetic acid with functional alkenes to give thioester derivatives that can be hydrolyzed under alkaline or acidic conditions.

Suitable silane based thiol molecules and siloxane based thiol molecules are disclosed by WO 2011/004255 A (KUROS BIOSURGERY), especially those in the examples 1 to 6.

A preferred example of a silane based thiol molecule for use in the aqueous UV free radical curable inkjet ink is tetra(3-mercaptopropyl)silane, which synthesis is described in Example 5 of WO 2011/004255 A (KUROS BIOSURGERY).

A preferred example of a siloxane based thiol molecule for use in the aqueous UV free radical curable inkjet ink is 2,4,6,8-tetra(2-mercaptoethyl)-2,4,6,8-tetramethylcyclo-tetrasiloxane, which synthesis is described in Example 4 of WO 2011/004255 A (KUROS BIOSURGERY).

More preferably silane based thiol molecules and siloxane based thiol molecules including secondary thiol groups are used in the aqueous UV free radical curable inkjet ink according to the invention. Such thiol molecules not only improve mechanical properties, but also reduce the odour problem.

A preferred example of a silane based thiol molecule containing secondary thiol groups is the compound represented by the formula TH-1:

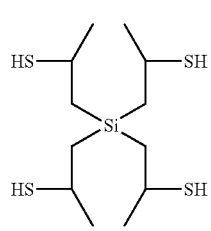

Formula TH-1

The synthesis of TH-1 may be performed in a multi-step reaction. In the first step, hydrogen bromide is reacted with tetraallylsilane to give tetrakis(2-bromopropyl)silane. The latter is converted with thiourea to its isothiouronium salt, which is then hydrolyzed with aqueous sodium hydroxide to give TH-1.

Thiol molecules that can dissolve in the aqueous medium of the UV free radical curable inkjet ink often tend to migrate in the substrate and may cause food safety issues when printing on food packaging. Preferred thiol molecules have a water solubility at 20° C. of less than 10 g/l water, more preferably of less than 5 g/l water and most preferably of less than 1 g/l water.

Alternatively for obtaining low migration properties bulky thiol molecules may be used. Preferred bulky thiol molecules which may be included in the aqueous medium of the UV free radical curable inkjet ink are so-called polyhedral oligomeric silsesquioxanes (POSS) represented by the following empirical formula [R(SiO$_{1.5}$)]$_n$ (n=4, 6, 8, 10, 12, 14, 16 and larger) that have specific cage structures such as represented in Table by formulae POSS-1 to POSS-3 or partial cage structures such as represented by formula POSS-4. R1 to R12 represent hydrogen as well as inorganic or organic substituents, but at least two of the R1 to R12 groups include a thiol group, preferably a secondary thiol group.

TABLE 2

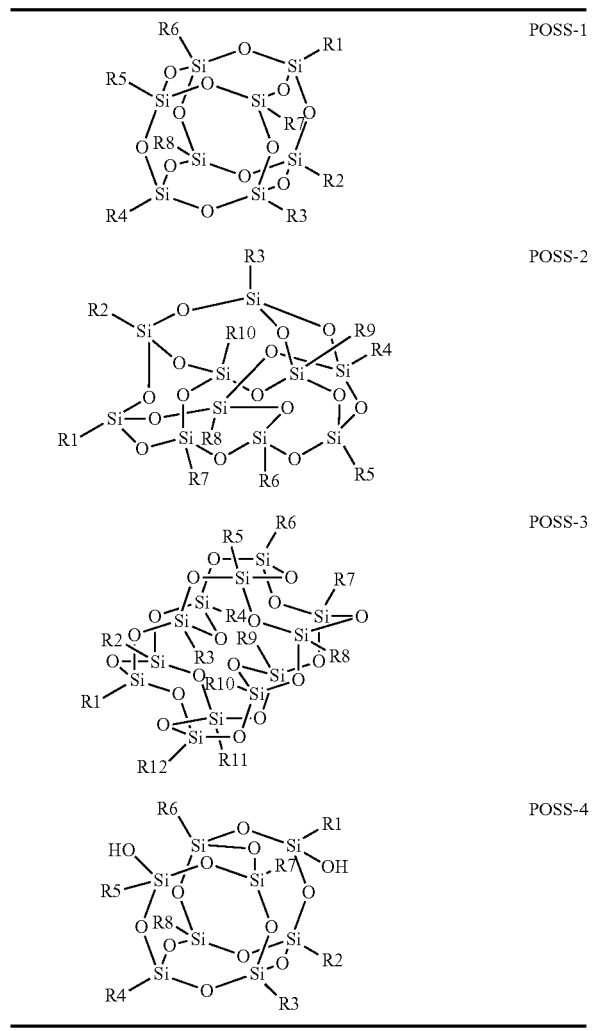

In the above thiol molecules POSS-1 to POSS-4, R1 to R12 each independently represent a hydrogen, an alkyl group, an alkenyl group, an alkynyl group, an aralkyl group, an alkaryl group and an aryl group, with the proviso that at least two of the R1 to R12 groups include a thiol group, preferably a secondary thiol group. The thiol group may be selected from an alkyl mercaptan group containing 1 to 6 carbon atoms and an aryl mercaptan, preferably a thiophenol.

A particularly preferred thiol molecule having a polyhedral oligomeric silsesquioxane structure is represented by POSS-5:

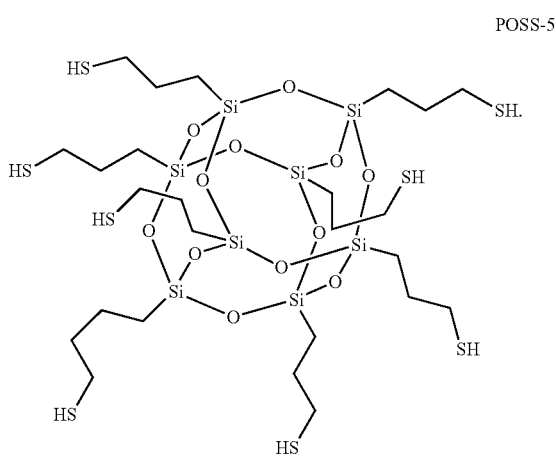 [SMILES: SCCCC[Si]12O[Si]3(CCCS)O[Si]4(CCCS)O[Si]5(CCCS)O[Si](CCCS)(O3)O[Si](CCCS)(O[Si](CCCS)(O5)O[Si](CCCS)(O4)O1)O2]

The structures and synthesis of silsesquioxanes have been discussed in more detail by R. Baney et al. in Chemical Review, 1995, 95, 1409-1430 as well as in the references cited therein and by Guizhi Li et al. in Journal of Inorganic and Organometallic Polymers, Vol. 11 (3), September 2001, page 123-154 as well as in the references cited therein. Silsesquioxanes with specific cage structures have been designated as polyhedral oligomeric silsesquioxanes, POSS. Such cage structures are described in Journal of Inorganic and Organometallic Polymers, Vol. 11 (3), September 2001, page 124, Scheme 1 (structures c-f).

An important benefit of polyhedral oligomeric silsesquioxanes is that it affords the material formulations with excellent thermal, mechanical and oxidative stability, as well as flammability resistance. This is largely due to the inorganic core of the POSS molecules.

Silsesquioxanes (POSS) containing thiol groups can be obtained from companies such as Hybrid Plastics, Fountain Valley, Calif. 92708-6117, USA.

Colorants

The colorant may be a dye but is preferably a colour pigment. The colour pigment is included in liquid phase A of the aqueous UV free radical curable inkjet ink according tot the invention. This results in a single colloid system which is beneficial for storage stability.

The pigments may be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley-VCH, 2004. ISBN 3527305769.

Preferred pigments are disclosed in paragraphs [0128] to [0138] of WO 2008/074548 (AGFA).

In a preferred embodiment, the aqueous UV free radical curable inkjet ink includes a colour pigment C.I. Pigment Blue 15:3 or 15:4 as a cyan colour pigment.

Also mixed crystals may be used. Mixed crystals are also referred to as solid solutions. For example, under certain conditions different quinacridones mix with each other to form solid solutions, which are quite different from both physical mixtures of the compounds and from the compounds themselves. In a solid solution, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions. A commercially available example is Cinquasia™ Magenta RT-355-D from Ciba Specialty Chemicals.

Also mixtures of pigments may be used. For example, the aqueous UV free radical curable inkjet ink may include a black pigment and at least one pigment selected from the group consisting of a blue pigment, a cyan pigment, magenta pigment and a red pigment. It was found that such a black fluid or inkjet ink had an improved appearance because of the neutral black colour.

The numeric average pigment particle size is preferably between 0.050 and 1 µm, more preferably between 0.070 and 0.300 µm and particularly preferably between 0.080 and 0.200 µm. Most preferably, the numeric average pigment particle size is no larger than 0.150 µm. An average particle size smaller than 0.050 µm is less desirable for decreased light fastness, but mainly also because very small pigment particles or individual pigment molecules thereof may still be extracted in food packaging applications.

However for white pigment inkjet inks, the numeric average particle diameter of the white pigment is preferably from 50 to 500 nm, more preferably from 150 to 400 nm, and most preferably from 200 to 350 nm. Sufficient hiding power cannot be obtained when the average diameter is less than 50 nm, and the storage ability and the jet-out suitability of the ink tend to be degraded when the average diameter exceeds 500 nm.

The determination of the average particle size (the numeric average particle diameter) is best performed by photon correlation spectroscopy at a wavelength of 633 nm with a 4 mW HeNe laser on a diluted sample of the pigmented inkjet ink. A suitable particle size analyzer used was a Malvern™ nano-S available from Goffin-Meyvis. A sample can, for example, be prepared by addition of one drop of ink to a cuvette containing 1.5 mL ethyl acetate and mixed until a homogenous sample was obtained. The measured particle size is the average value of 3 consecutive measurements consisting of 6 runs of 20 seconds.

Suitable white pigments are given by Table 2 in [0116] of WO 2008/074548 (AGFA). The white pigment is preferably a pigment with a refractive index greater than 1.60. The white pigments may be employed singly or in combination. Preferably titanium dioxide is used as pigment with a refractive index greater than 1.60. Preferred titanium dioxide pigments are those disclosed in [0117] and in [0118] of WO 2008/074548 (AGFA).

The pigments are preferably present in the range of 0.01 to 15%, more preferably in the range of 0.05 to 10% by weight and most preferably in the range of 0.1 to 8% by weight, each based on the total weight of the aqueous UV free radical curable inkjet ink. The white pigment is preferably present in an amount of 3% to 40% by weight of the aqueous UV free radical curable inkjet ink, and more preferably 5% to 35%. An amount of less than 3% by weight cannot achieve sufficient covering power and usually exhibits very poor storage stability and ejection property.

Polymeric Dispersants for the Colour Pigments

Typical polymeric dispersants are copolymers of two monomers but may contain three, four, five or even more monomers. The properties of polymeric dispersants depend on both the nature of the monomers and their distribution in the polymer. Copolymeric dispersants preferably have the following polymer compositions:

statistically polymerized monomers (e.g. monomers A and B polymerized into ABBAABAB);

alternating polymerized monomers (e.g. monomers A and B polymerized into ABABABAB);

gradient (tapered) polymerized monomers (e.g. monomers A and B polymerized into AAABAABBABBB);

block copolymers (e.g. monomers A and B polymerized into AAAAABBBBBB) wherein the block length of each of the blocks (2, 3, 4, 5 or even more) is important for the dispersion capability of the polymeric dispersant;

graft copolymers (graft copolymers consist of a polymeric backbone with polymeric side chains attached to the backbone); and mixed forms of these polymers, e.g. blocky gradient copolymers.

Suitable polymeric dispersants are listed in the section on "Dispersants", more specifically [0064] to [0070] and [0074] to [0077], in EP 1911814 A (AGFA GRAPHICS) incorporated herein as a specific reference.

The polymeric dispersant has preferably a number average molecular weight Mn between 500 and 30000, more preferably between 1500 and 10000.

The polymeric dispersant has preferably a weight average molecular weight Mw smaller than 100,000, more preferably smaller than 50,000 and most preferably smaller than 30,000.

The polymeric dispersant has preferably a polydispersity PD smaller than 2, more preferably smaller than 1.75 and most preferably smaller than 1.5.

Commercial examples of polymeric dispersants are the following:

DISPERBYK™ dispersants available from BYK CHEMIE GMBH;

SOLSPERSE™ dispersants available from NOVEON;

TEGO™ DISPERS™ dispersants from EVONIK;

EDAPLAN™ dispersants from MÜNZING CHEMIE;

ETHACRYL™ dispersants from LYONDELL;

GANEX™ dispersants from ISP;

DISPEX™ and EFKA™ dispersants from CIBA SPECIALTY CHEMICALS INC;

DISPONER™ dispersants from DEUCHEM; and

JONCRYL™ dispersants from JOHNSON POLYMER.

Particularly preferred polymeric dispersants include Solsperse™ dispersants from NOVEON, Efka™ dispersants from CIBA SPECIALTY CHEMICALS INC and Disperbyk™ dispersants from BYK CHEMIE GMBH. Particularly preferred dispersants are Solsperse™ 32000, 35000 and 39000 dispersants from NOVEON.

The polymeric dispersant is preferably used in an amount of 2 to 600 wt %, more preferably 5 to 200 wt %, most preferably 50 to 90 wt % based on the weight of the pigment.

Stabilizers & Inhibitors

The aqueous UV free radical curable inkjet ink according to the present invention may further comprise at least one antioxidant for improving the storage stability of an image.

As the antioxidant for improving storage stability of an image, various organic and metal complex type fading preventives can be used in the invention. Organic fading preventives include hydroquinones, alkoxyphenols, dialkoxyphenols, phenols, anilines, amines, indanes, coumarones, alkoxyanilines and heterocycles, while metal complexes include nickel complexes and zinc complexes. More specifically, compounds as described in "Research Disclosure, No. 17643, VII, Section I or J, No. 15162, No. 18716, left column on page 650, No. 36544, page 527, No. 307105, page 872, and the patent cited in No. 15162, and compounds embraced in the formula of the typical compounds and compound examples described on pages 127 to 137 of JP 62215272 A (FUJI).

The stabilizer is added in an amount of 0.1 to 30 wt %, preferably 1 to 10 wt % based on the total weight of the aqueous UV curable inkjet ink.

Continuous Liquid Phase B

The liquid phase A is dispersed into the continuous phase B, the latter is an aqueous medium. The aqueous medium may consist of water, but preferably includes one or more organic solvents.

Other compounds, such as surfactants, alkaline compounds and biocides may be included in the aqueous medium.

The aqueous medium may contain an organic solvent to prevent the clogging of the nozzle, due to its ability to slow down the evaporation rate of inkjet ink, especially the water in the inkjet ink. The organic solvent preferably has a much higher boiling point than water.

Organic Solvents

The continuous phase B may contain one or more organic solvents.

Suitable organic solvents include triacetin, N-methyl-2-pyrrolidone, 2-pyrrolidone, glycerol, urea, thiourea, ethylene urea, alkyl urea, alkyl thiourea, dialkyl urea and dialkyl thiourea, diols, including ethanediols, propanediols, propanetriols, butanediols, pentanediols, and hexanediols; glycols, including propylene glycol, polypropylene glycol, ethylene glycol, polyethylene glycol, diethylene glycol, tetraethylene glycol, and mixtures and derivatives thereof. Preferred humectants are 2-pyrrolidone, glycerol and 1,2-hexanediol, since the latter were found to be the most effective for improving inkjet printing reliability in an industrial environment.

The organic solvent is preferably added in an amount of 1 to 60 wt %, more preferably 5 to 45 wt %, and most preferably 10 to 35 wt % of the aqueous UV free radical curable inkjet ink.

Biocides

A biocide may be added to the aqueous continuous phase B to prevent unwanted microbial growth, which may occur in the ink-jet ink over time. The biocide may be used either singly or in combination.

Suitable biocides for the aqueous UV free radical curable inkjet ink of the present invention include sodium dehydroacetate, 2-phenoxyethanol, sodium benzoate, sodium pyridinethion-1-oxide, ethyl p-hydroxybenzoate and 1,2-benzisothiazolin-3-one and salts thereof.

Preferred biocides are Proxel™ GXL and Proxel™ Ultra 5 available from ARCH UK BIOCIDES and Bronidox™ available from COGNIS.

A biocide is preferably added to the aqueous medium in an amount of 0.001 to 3 wt. %, more preferably 0.01 to 1.0 wt. %, each based on the aqueous UV curable inkjet ink.

pH-Adjusters

The aqueous UV free radical curable inkjet ink may contain at least one pH adjuster. Suitable pH adjusters include NaOH, KOH, $NEt_3$, $NH_3$, HCl, $HNO_3$, $H_2SO_4$ and (poly)alkanolamines such as triethanolamine and 2-amino-2-methyl-1-propanol. Preferred pH adjusters are triethanol amine, NaOH and $H_2SO_4$.

The aqueous UV free radical curable inkjet ink has a pH of preferably larger than 7.0, more preferably a pH between 7.5 and 12.0, most preferably between 8.0 and 11.0.

Surfactants

The aqueous UV free radical curable inkjet ink may contain at least one surfactant. The surfactant(s) can be anionic, cationic, non-ionic, or zwitter-ionic and are usually added in a total quantity less than 2 wt % based on the total weight of the inkjet ink and particularly in a total less than 1 wt % based on the total weight of the inkjet ink.

In a particular preferred embodiment, the aqueous UV free radical curable inkjet ink may contain an ionic surfactant, such as Alkanol™ XC from DUPONT.

Suitable surfactants for the aqueous UV free radical curable inkjet ink include fatty acid salts, ester salts of a higher alcohol, alkylbenzene sulphonate salts, sulphosuccinate ester salts and phosphate ester salts of a higher alcohol (for example, sodium dodecylbenzenesulphonate and sodium dioctylsulphosuccinate), ethylene oxide adducts of a higher alcohol, ethylene oxide adducts of an alkylphenol, ethylene oxide adducts of a polyhydric alcohol fatty acid ester, and acetylene glycol and ethylene oxide adducts thereof (for example, polyoxyethylene nonylphenyl ether, and SURFYNOL™ 104, 104H, 440, 465 and TG available from AIR PRODUCTS & CHEMICALS INC.).

Preferred surfactants are selected from fluoro surfactants and/or silicone surfactants.

Particularly preferred commercial fluorosurfactants are Capstone™ FS3100 from DU PONT, Tivida™ FL2500 from MERCK and Thetawet™ FS8150 from NEOCHEM GMBH.

The aqueous UV free radical curable inkjet ink preferably does not contain a silicon oil, such as a polyether-modified silicone oil.

Polymeric Dispersants for the Liquid Phase A

The polymeric dispersant for dispersing the liquid phase A is preferably soluble in an amount of at least 10 wt %, more preferably at least 15 wt % and most preferably at least 20 wt % in water.

In a preferred embodiment, the polymeric dispersant for dispersing the liquid phase A has an amphiphilic character, meaning that dispersant has both hydrophilic and hydrophobic groups.

In a preferred embodiment, the aqueous UV free radical curable inkjet ink does not contain an amphiphilic urethane (meth)acrylate or a polymer thereof.

The polymeric dispersant when dispersing the liquid phase A is preferably not crosslinked as this reduces the spreading of the ink when jetted on a substrate.

In principle any amphiphilic polymeric dispersant known in the art can be used for emulsifying the liquid phase A in the continuous liquid phase B (McClements J. D., Handbook of Industrial Water Soluble Polymers, 98-133 (2007), ed. Williams P. E.). The polymeric dispersing agent can be selected from natural polymers or derivatives thereof, such as starch, gelatine and albumin derivatives, non ionic polymeric emulsifying polymers such as poly(ethylene oxide)- poly(propylene oxide) copolymers, amphiphilic ionic addition polymers, preferably anionic amphiphilic addition polymers, more preferably acrylate based, and amphiphilic polycondensation based polymers such as poly(esters) or poly(urethanes), preferably functionalized with ionic hydrophilic groups and/or poly(ethylene oxide) chains.

Suitable polymeric dispersants are copolymers of two monomers but they may contain three, four, five or even more monomers. The properties of polymeric dispersants depend on both the nature of the monomers and their distribution in the polymer. Copolymeric dispersants preferably have the following polymer compositions:

statistically polymerized monomers (e.g. monomers A and B polymerized into ABBAABAB);

alternating polymerized monomers (e.g. monomers A and B polymerized into ABABABAB);

gradient (tapered) polymerized monomers (e.g. monomers A and B polymerized into AAABAABBABBB);

block copolymers (e.g. monomers A and B polymerized into AAAAABBBBBB) wherein the block length of each of the blocks (2, 3, 4, 5 or even more) is important for the dispersion capability of the polymeric dispersant;

graft copolymers (graft copolymers consist of a polymeric backbone with polymeric side chains attached to the backbone); and mixed forms of these polymers, e.g. blocky gradient copolymers.

The polymeric dispersant has preferably a number average molecular weight Mn between 500 and 30000, more preferably between 1500 and 10000.

The polymeric dispersant has preferably a weight average molecular weight Mw smaller than 100,000, more preferably smaller than 50,000 and most preferably smaller than 30,000.

The polymeric dispersant has preferably a polydispersity PD smaller than 2, more preferably smaller than 1.75 and most preferably smaller than 1.5.

The polymeric dispersant is preferably used in an amount of 3 to 20 wt % based on the weight of the aqueous UV free radical curable inkjet ink.

Particularly preferred examples of suitable polymeric dispersants are acrylic dispersants having i) hydrophilic monomers preferably including acidic monomers and ii) hydrophobic monomers.

Acidic monomers are preferably present in the acrylic dispersant in an amount ranging from about 0.1 wt % to about 30 wt % (based on the total wt % of the polymeric dispersant). Acidic monomers that may be used in the acrylic dispersant may include, for example, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, and combinations thereof.

Examples of the hydrophobic monomers that can be included in the acrylic dispersant may include styrene, p-methyl styrene, methyl methacrylate, hexyl acrylate, hexyl methacrylate, butyl acrylate, butyl methacrylate, ethyl acrylate, ethyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, ethoxylated nonyl phenol methacrylate, isobornyl methacrylate, cyclohexyl methacrylate, t-butyl methacrylate, n-octyl methacrylate, lauryl methacrylate, trydecyl methacrylate, alkoxylated tetrahydrofurfuryl acrylate, isodecyl acrylate, isobornylmethacrylate, and combinations thereof.

Suitable commercially available polymeric dispersants include JONCRYL® 683 and JONCRYL® 671 (BASF Corp.), or E-SPERSE® 100 (Ethox Chemicals, LLC).

Another preferred polymeric dispersant is a copolymer comprising between 3 and 11 mol % of a long aliphatic chain (meth)acrylate wherein the long aliphatic chain contains at least 10 carbon atoms.

The long aliphatic chain (meth)acrylate contains 10 to 18 carbon atoms. The long aliphatic chain (meth)acrylate is preferably decyl (meth)acrylate. The polymeric dispersant comprises preferably at least 2 other monomers and/or oligomers and preferably the polymeric dispersant comprises preferably at least 25 mol % (meth)acrylic acid.

The polymeric dispersant can be prepared with a simple controlled polymerization of a mixture of monomers and/or oligomers including between 3 and 11 mol % of a long aliphatic chain (meth)acrylate wherein the long aliphatic chain contains at least 10 carbon atoms.

Such a polymeric dispersant is also commercially available as Edaplan™ 482 from MÜNZING CHEMIE.

Another particular preferred polymeric dispersant for the liquid phase A is a polymeric dispersant with heterocyclic groups having hetero atoms comprising of one or two nitrogen atoms, preferably a polymeric dispersant with heterocyclic groups having hetero atoms consisting of one or two nitrogen atoms. Such a polymeric dispersant having heterocyclic groups having hetero atoms consisting of one or two nitrogen atoms was found to result in an excellent storage stability of the aqueous UV free radical curable inkjet ink In a preferred embodiment, the heterocyclic groups having hetero atoms consisting of one or two nitrogen atoms include pyridine groups.

In a preferred embodiment, the polymeric dispersant is a copolymer of vinyl-2-pyridine or vinyl-4-pyridine, more preferably including an acrylate as co-monomer, and most preferably including a butyl acrylate monomer as acrylate co-monomer. The co-monomer may also be a styrene monomer.

In a very preferred embodiment, the amine value of the polymeric dispersant is at least 30 mg KOH/g. This means that a plurality of heterocyclic groups having hetero atoms consisting of one or two nitrogen atoms, such as pyridine groups, is present in the aqueous UV free radical curable inkjet ink.

Such a polymeric dispersant is also commercially available as Efka™ PX 4701 from BASF.

Opthothermal Converting Agents

The aqueous UV free radical curable inkjet ink may contain an optothermal converting agent for the conversion of electromagnetic radiation into heat when the inkjet printed image is exposed to an infrared light source, such as a laser, a laser diode or a LED.

The presence of an optothermal converting agent allows for faster drying.

The optothermal converting agent may be any suitable compound absorbing in the wavelength range of emission by the infrared light source.

The optothermal converting agent is preferably an infrared dye as this allows easy handling into the inkjet ink. The infrared dye may be included into the dispersed liquid phase A, but is preferably included in the continuous phase B. In the latter case, the heat transfer is usually much more effective.

Suitable examples of infrared dyes include, but are not limited to, polymethyl indoliums, metal complex IR dyes, indocyanine green, polymethine dyes, croconium dyes, cyanine dyes, merocyanine dyes, squarylium dyes, chalcogenopyryloarylidene dyes, metal thiolate complex dyes, bis(chalcogenopyrylo)polymethine dyes, oxyindolizine dyes, bis(aminoaryl)polymethine dyes, indolizine dyes, pyrylium dyes, quinoid dyes, quinone dyes, phthalocyanine dyes, naphthalocyanine dyes, azo dyes, (metalized) azomethine dyes and combinations thereof.

The one or more optothermal converting agents are preferably present in the range of 0.1 to 10 wt % based on the total weight of the aqueous UV free radical curable inkjet ink.

Methods of Manufacturing Inkjet Inks

A method of manufacturing an aqueous UV free radical curable inkjet ink (1) including the steps of:
- providing a liquid phase A containing at least a photoinitiator (6), a colour pigment (5), and one or more polymerizable compounds (4);
- providing a continuous liquid phase B (2) containing a polymeric dispersant (3), water and optionally one or more organic solvents; and
- dispersing the liquid phase A in the continuous liquid phase B.

For including the colour pigment (5) in the liquid phase A, preferably a concentrated pigment dispersions is be prepared by milling the pigment in the dispersion medium, i.e. one or more polymerizable compounds (4) present in the liquid phase A, in the presence of a polymeric dispersant.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

Many different types of materials may be used as milling media, such as glasses, ceramics, metals, and plastics. In a preferred embodiment, the grinding media can comprise particles, preferably substantially spherical in shape, e.g. beads consisting essentially of a polymeric resin or yttrium stabilized zirconium beads.

In the process of mixing, milling and dispersion, each process is performed with cooling to prevent build up of heat, and as much as possible under light conditions in which actinic radiation has been substantially excluded.

The pigment dispersion may contain more than one pigment, the pigment dispersion or ink may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients of the mill grind will vary widely depending upon the specific materials and the intended applications. The contents of the milling mixture comprise the mill grind and the milling media. The mill grind comprises pigment, polymeric dispersant and a liquid carrier. For inkjet inks, the pigment is usually present in the mill grind at 1 to 50 wt %, excluding the milling media. The weight ratio of pigment over polymeric dispersant is 20:1 to 1:2.

The milling time can vary widely and depends upon the pigment, the selected mechanical means and residence conditions, the initial and desired final particle size, etc. In the present invention preferably pigment dispersions with an average particle size of less than 150 nm are prepared.

After milling is completed, the milling media is separated from the milled particulate product (in either a dry or liquid dispersion form) using conventional separation techniques, such as by filtration, sieving through a mesh screen, and the like. Often the sieve is built into the mill, e.g. for a bead mill. The milled pigment concentrate is preferably separated from the milling media by filtration.

Substrates

There is no real limitation on the type of substrate for inkjet printing the aqueous UV free radical curable inkjet ink of the invention on. The substrates may have ceramic, metallic, glass, wood, paper or polymeric surfaces for printing. The substrate may also be primed, e.g. by a white ink.

The substrate is preferably selected from a polyethylene terephthalate substrate, a polylactic acid substrate, a PVC substrate, a textile substrate and a leather substrate, paperboard substrate, corrugated substrate and wood substrate.

The substrate may be porous, as e.g. textile, paper and card board substrates, or substantially non-absorbing substrates such as e.g. a plastic substrate having a polyethylene terephthalate surface.

Preferred substrates including surfaces of polyethylene, polypropylene, polycarbonate, polyvinyl chloride, polyesters like polyethylene terephthalate (PET), polyethylene naphthalate (PEN) and polylactic acid (PLA) and polyimide.

The substrate may also be a paper substrate, such as plain paper or resin coated paper, e.g. polyethylene or polypropylene coated paper. There is no real limitation on the type of paper and it includes newsprint paper, magazine paper, office paper, wallpaper but also paper of higher grammage, usually referred to as boards, such as white lined chipboard, corrugated board and packaging board.

The substrates may be transparent, translucent or opaque. Preferred opaque substrates includes so-called synthetic paper, like the Synaps™ grades from Agfa-Gevaert which are an opaque polyethylene terephthalate sheet having a density of 1.10 g/cm$^3$ or more.

There is no restriction on the shape of the substrate. It can be a flat sheet, such a paper sheet or a polymeric film or it can be a three dimensional object like e.g. a plastic coffee cup. The three dimensional object can also be a container like a bottle or a jerry-can for including e.g. oil, shampoo, insecticides, pesticides, solvents, paint thinner or other type of liquids.

In a preferred embodiment of the inkjet printing method, the substrate is selected from textile, leather, pharmaceutical and food packaging.

In a preferred embodiment of the inkjet printing method, the substrate is a rigid medium selected from rigid PVC, paperboard, corrugated and wood.

In a preferred embodiment of the inkjet printing method, the substrate is substrate suitable for soft signage applications, such as banners, posters, POP/POS displays, indoor wall graphics, tradeshow displays, parasols, flags, outdoor advertising and backdrops.

A major advantage of the current aqueous UV free radical curable inkjet ink in textile inkjet printing is that not only a wide range of textiles can be printed upon, but that after the UV curing no post-treatments are necessary. For example, a classic washing process to remove dyes that are unfixed from the textile is not necessary. In addition, also many pre-treatments of textiles can be avoided. For example, where classic textile inkjet printing processes require the application of a water-soluble polymer to the textile prior to inkjet printing in order to prevent ink bleeding, this is usually not necessary with the aqueous UV free radical curable inkjet ink of the present invention. The avoidance of these pre- and post treatment speed-up and simplify the manufacturing of inkjet printed textiles, resulting in an economical bonus. For example, no cumbersome ink swaps have to be performed in the inkjet printer, when changing the type of textile substrate. Also waste generated in the post-treatment can be avoided.

Suitable textiles can be made from many materials. These materials come from four main sources: animal (e.g. wool, silk), plant (e.g. cotton, flax, jute), mineral (e.g. asbestos, glass fibre), and synthetic (e.g. nylon, polyester, acrylic). Depending on the type of material, it can be woven or non-woven textile.

The textile substrate is preferably selected from the group consisting of cotton textiles, silk textiles, flax textiles, jute textiles, hemp textiles, modal textiles, bamboo fibre textiles, pineapple fibre textiles, basalt fibre textiles, ramie textiles, polyester based textiles, acrylic based textiles, glass fibre textiles, aramid fibre textiles, polyurethane textiles (e.g. Spandex or Lycra™), Tyvek™ and mixtures thereof.

Suitable polyester textile includes polyethylene terephthalate textile, cation dyeable polyester textile, acetate textile, diacetate textile, triacetate textile, polylactic acid textile and the like.

Applications of these textiles include automotive textiles, canvas, banners, flags, interior decoration, clothing, hats, shoes, floor mats, doormats, brushes, mattresses, mattress covers, linings, sacking, stage curtains, flame-retardant and protective fabrics, and the like. Polyester fibre is used in all types of clothing, either alone or blended with fibres such as cotton. Aramid fibre (e.g. Twaron) is used for flame-retardant clothing, cut-protection, and armor. Acrylic is a fibre used to imitate wools.

Inkjet Printing Devices

The aqueous UV free radical curable inkjet ink may be jetted by one or more print heads ejecting small droplets of ink in a controlled manner through nozzles onto an ink-receiver surface, which is moving relative to the print head(s).

The inkjet printing device preferably includes a plurality of the aqueous UV free radical curable inkjet ink according to the invention.

A preferred print head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the print head creating a void, which is then filled with ink. When the voltage is again removed, the ceramic expands to its original shape, ejecting a drop of ink from the print head. However the inkjet printing method according to the present invention is not restricted to piezoelectric inkjet printing. Other inkjet print heads can be used and include various types, such as a continuous type and thermal, electrostatic and acoustic drop on demand type.

The inkjet print head normally scans back and forth in a transversal direction across the moving ink-receiver surface. Often the inkjet print head does not print on the way back. Bi-directional printing is preferred for obtaining a high areal throughput. Another preferred printing method is by a "single pass printing process", which can be performed by using page wide inkjet print heads or multiple staggered inkjet print heads which cover the entire width of the ink-receiver surface. In a single pass printing process the inkjet print heads usually remain stationary and the substrate surface is transported under the inkjet print heads.

For enhancing the reliability of the inkjet printing process, the aqueous UV free radical curable inkjet ink is preferably jetted using a through flow print head, more preferably through flow piezoelectric print head. By using a through flow print head, the sedimentation of the colour pigment or the polymeric particles in the aqueous UV free radical curable inkjet ink is effectively prevented. The recirculation of the aqueous UV free radical curable inkjet ink causes enough agitation to keep the colour pigment and the polymeric particles well-dispersed.

The inkjet printing device preferably includes in order a thermal curing device and a UV curing device.

In a preferred embodiment, the drop size of the aqueous UV free radical curable inkjet ink is smaller than 12 pL, preferably smaller than 10 pL and most preferably smaller than 8 pL.

In a preferred embodiment, the inkjet printing device is a so-called roll-to-roll inkjet printer, preferably including more than 8 through flow print heads having a nozzle plate longer than 4 cm. The nozzle plate is preferably provided with a non-wetting coating.

Curing Devices

For curing the aqueous UV free radical curable inkjet ink according to present invention two curing devices are present. A thermal curing device is first used for drying the aqueous UV free radical curable inkjet ink, where after a UV curing device is used for UV curing the aqueous UV free radical curable inkjet ink.

Thermal Curing Devices

The inkjet device contains a thermal curing device for removing water and organic solvents in the inkjet printed image. The thermal curing device may consist out of different units.

A pre-heating device may be included in the inkjet printing device for heating the substrate prior to jetting. The pre-heating device may be an infrared radiation source as described here below, or may be a heat conduction device, such as a hot plate or a heat drum. A preferred heat drum is an induction heat drum.

The thermal curing device may include a dryer. Suitable dryers include devices circulating hot air, ovens, and devices using air suction. However for reducing energy consumption, preferably infrared radiation sources are used for thermal curing.

Preferred infrared radiation sources include near infrared radiation sources (NIR: 750-1400 nm) and short wave infrared radiation sources (SWIR: 1400-3000 nm). An advantage is that glass lenses, which may be included in the curing device for focusing the infrared light on the substrate, transmit in this infrared region, contrary to mid-wavelength infrared light (MWIR: 3000-8000 nm) or long-wavelength infrared light (LWIR: 8000-15000 nm).

The most preferred infrared light source is a SWIR light source because the water absorption significantly increases at 1450 nm.

A commercial example of a SWIR light source is a carbon infrared emitter CIR™ available from HERAEUS, for example emitting at a wavelength of about 2000 nm.

Another preferred thermal curing device is a NIR source emitting near infrared radiation. NIR-radiation energy quickly enters into the depth of the inkjet ink layer and removes water and solvents out of the whole layer thickness, while conventional infrared and thermo-air energy predominantly is absorbed at the surface and slowly conducted into the ink layer, which results usually in a slower removal of water and solvents.

A commercially available NIR emitters are available from ADPHOS.

The thermal curing device may be, preferably at least in part, arranged in combination with the print head of the inkjet printer, travelling therewith so that the curing radiation is applied very shortly after jetting. This allows pinning the aqueous UV free radical curable inkjet ink when jetted on the substrate.

UV Curing Devices

The inkjet printing device includes also a UV curing device emitting UV radiation which is adsorbed by the photoinitiator or photoinitiating system of the aqueous UV free radical curable inkjet ink for starting the polymerization reaction.

The UV curing device may be a so-called cold UV lamp, such as UV LEDs, but may also emit so much heat radiation, e.g. a high or low pressure mercury lamp, that it is also able to remove water and organic solvents in the inkjet printed image.

After drying, an aqueous UV free radical curable inkjet ink is cured by exposure to ultraviolet radiation. The curing means may consist out of UV LEDs, because such an arrangement is advantageous for energy consumption compared to mercury lamps. The source of UV radiation may be an elongated radiation source extending transversely across the substrate to be cured.

Any ultraviolet light source, as long as part of the emitted light can be absorbed by the photoinitiator or photoinitiator system, may be employed as a radiation source, such as a high or low pressure mercury lamp, a cold cathode tube, a black light, an ultraviolet LED, an ultraviolet laser, and a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:

UV-A: 400 nm to 320 nm
UV-B: 320 nm to 290 nm
UV-C: 290 nm to 100 nm.

In a preferred embodiment, the inkjet printing device contains UV LEDs with a wavelength larger than 360 nm, preferably UV LEDs with a wavelength larger than 380 nm, and most preferably UV LEDs with a wavelength of about 395 nm.

In a preferred embodiment, the inkjet printing device including a plurality of the aqueous UV curable inkjet inks of the invention is an inkjet device lacking a mercury lamp.

Furthermore, it is possible to cure the image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages for obtaining a fast curing speed and a high curing degree.

By using a thiol compound in the aqueous UV curable inkjet ink, the inkjet printing device does not require one or more expensive oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. The thiol compound allows to execute thiol-ene or thiol-yne click chemistry, which is insensitive to oxygen inhibition contrary to the conventional (meth)acrylate chemistry. The reason is that a hydroperoxy radical formed by the presence of oxygen can abstract a labile hydrogen from a thiol compound so that the thiol radical can still add to e.g. an acrylate monomer, while the hydroperoxy radical does not initiate the acrylate polymerization.

In a preferred embodiment, the inkjet printing device including a plurality of the aqueous UV curable inkjet inks of the invention is an inkjet device lacking an oxygen depletion unit.

Inkjet Printing Methods

A preferred inkjet printing method includes in order at least the steps of:

a) jetting an aqueous UV free radical curable inkjet ink according to the present invention on a substrate;
b) applying heat and/or infrared light to the aqueous UV free radical curable inkjet ink jetted on the substrate; and
c) applying UV light to the aqueous UV free radical curable inkjet ink jetted on the substrate.

EXAMPLES

Materials

All materials used in the following examples were readily available from standard sources such as Sigma-Aldrich (Belgium) and Acros (Belgium) unless otherwise specified. The water used in the examples was demineralised water.

PB15:4 is an abbreviation used for Hostaperm™ Blue P-BFS, a cyan pigment (C.I. Pigment Blue 15:4) available from CLARIANT.

S35000 is an abbreviation used for SOLSPERSE™ 35000, a polyethyleneimine-polyester hyperdispersant from NOVEON.

DPGDA is dipropyleneglycoldiacrylate from ARKEMA.

SR339 is 2-phenoxyethyl acrylate available as Sartomer™ SR339C from ARKEMA.

TPO is an abbreviation used for 2,4,6-trimethylbenzoyl-diphenyl-phosphineoxide available under the trade name Darocur™ TPO from BASF.

PBZ is an abbreviation used for 4-phenylbenzophenone, a photoinitiator available under the trade name Genocure™ PBZ is from RAHN AG.

EPD is ethyl 4-dimethylaminobenzoate, available under the trade name of Genocure™ EPD from RAHN AG.

Stabi-1 is a mixture forming a polymerization inhibitor having a composition according to Table 3.

TABLE 3

| Component | wt % |
|---|---|
| DPGDA | 82.4 |
| p-methoxyphenol | 4.0 |
| 2,6-di-tert-butyl-4-methylphenol | 10.0 |
| Cupferron ™ AL | 3.6 |

Cupferron™ AL is aluminum N-nitrosophenylhydroxylamine from WAKO CHEMICALS LTD.

BYK™ UV3510 is a polyether modified polydimethylsiloxane wetting agent available from BYK CHEMIE GMBH.

E7701 is a butylacrylate-vinylpyridine copolymer having an amine value of 40 mg KOH/g available as Efka™ PX 4701 from BASF.

Omnipol™ TX is a polymeric thioxanthone supplied by IGM.

Omnipol™ 9210 is a polymeric α-amino-ketone Norrish type I photoinitiator supplied by IGM.

Genopol™ AB1 is a polymeric aminobenzoate derivate, useful as a co-initiator, available from RAHN AG.

Alkanol™ XC is a surfactant (CAS 68442-09-1) from DU PONT.

PET is an Astera™ X100.021 PET foil from Agfa-Gevaert N.V.

PU Plate is a 5 mm thick polyurethane foam core having white plastic coated cover layers available as KAPA™ plast from ANTALIS.

Measurement Methods

1. Dry Rub Resistance

The dry rub resistance was evaluated by scratching each of the samples for 30 times using a Q-tip. The damage of the coating was evaluated visually and scored in accordance with a criterion described by Table 4.

TABLE 4

| Evaluation value | Criterion |
|---|---|
| 0 | no visual damage |
| 1 | minor surface damage. |
| 2 | clear surface damage |
| 3 | damage in the depth of the coating |
| 4 | complete removal of the coating |

2. Viscosity

The viscosity of the inkjet ink was measured using a Brookfield DV-II+ viscometer at 25° C. at 4 rotations per minute (RPM) using a CPE 40 spindle.

3. Average Particle Size Pigment Perticles

The average particle size of pigment particles in a 100% solids dispersion or inkjet ink was determined with a Brookhaven Instruments Particle Sizer BI90plus based upon the principle of dynamic light scattering. The ink or dispersion was diluted with ethyl acetate to a pigment concentration of 0.002 wt %. The measurement settings of the BI90plus were: 5 runs at 23° C., angle of 90°, wavelength of 635 nm and graphics=correction function.

4. Storage Stability

The storage stability was evaluated by comparing the viscosity and average particle size before and after a heat treatment of one week at 60° C.

5. Average Particle Size of Dispersed Liquid Phase A

The average particle size of the dispersed liquid phase A was determined by photon correlation spectroscopy at a wavelength of 633 nm with a 4 mW HeNe laser. The apparatus used was a Malvern™ Nano-S available from Goffin-Meyvis.

4. Surface Tension

The static surface tension of the UV curable inks was measured with a KRÜSS tensiometer K9 from KRÜSS GmbH, Germany at 25° C. after 60 seconds.

Example 1

This example illustrates the manufacturing, curing and jetting properties of an aqueous UV free radical curable inkjet ink in accordance with the invention, wherein a state-of-the-art UV free radical curable inkjet ink was used as the liquid phase A.

Preparation of a State-of-the-Art UV Free Radical Curable Inkjet Ink INK-1

The state-of-the-art UV free radical curable inkjet ink is a so-called 100% solids UV curable inkjet ink, meaning that no water or organic solvent is present in the ink.

First a concentrated cyan pigment dispersion CPD1 was prepared by mixing for 30 minutes the components according to Table 5 in a 20 L vessel. The vessel was then connected to a Bachofen DYNOMILL ECM Pilot mill having an internal volume of 1.5 L filled for 63% with 0.4 mm yttrium stabilized zirconia beads. The mixture was circulated over the mill for 2 hours at a flow rate of about 2 L per minute and a rotation speed in the mill of about 13 m/s. After milling the dispersion was separated from the beads using a filter cloth. The dispersion was then discharged into a 10 L vessel.

TABLE 5

| Component | wt % |
|---|---|
| PB15:4 | 15 |
| S35000 | 15 |
| Stabi-1 | 1 |
| DPGDA | 69 |

A state-of-the-art UV free radical curable inkjet ink INK-1 was prepared according to Table 6 using the concentrated pigment dispersion CPD1 and some additional components. The weight % (wt %) of the components were based on the total weight of the UV curable inkjet ink.

TABLE 6

| wt % of component: | INK-1 |
|---|---|
| PB15:4 | 3.00 |
| S35000 | 3.00 |
| DPGDA | 80.45 |
| TPO | 4.95 |
| EPD | 5.00 |
| PBZ | 2.50 |
| Stabi-1 | 1.00 |
| BYK ™ UV3510 | 0.10 |

The UV free radical curable inkjet ink INK-1 exhibited an average particle size of 138 nm, a viscosity of 22 mPa·s and a surface tension of 23 mN/m.

The UV free radical curable inkjet ink INK-1 was stored at 60° C. for 7 days and the viscosity and particle size were measured again. The particle size was 145 nm and the viscosity remained unchanged at 22 mPa s.

Preparation of the Aqueous UV Free Radical Curable Inkjet Ink UV-1

100 g of INK-1 was added to solution of 51 g E7701 in 449 g of water. The mixture was stirred for 5 minutes using a high-speed stirrer (Homorex™) and then passed through a Type M110F high pressure homogenizer from MICROFLUIDICS™ Corporation at a pressure of 300 bar to obtain the aqueous UV free radical curable inkjet ink UV-1.

The viscosity and particle size of the aqueous UV free radical curable inkjet ink UV-1 were measured and found to be comparable before and after storage at 60° C. for 7 days.

Evaluation and Results

The aqueous UV free radical curable inkjet ink UV-1 was coated on a 100 μm PET foil using a 10 μm wired bar and air dried for 1 minute. The coated sample was UV cured, using a Fusion DRSE-120 conveyer, equipped with a Fusion VPS/1600 lamp (D-bulb). The sample was passed under the lamp at a belt speed of 20 m/min and at full power of the lamp.

The dry rub resistance of the UV cured sample was evaluated and found to have an evaluation value of 0 (no visual damage).

The jetting performance was evaluated by addition to the aqueous UV free radical curable inkjet ink UV-1 of a humectant and a surfactant to obtain an aqueous UV free radical curable inkjet ink UV-2 according to Table 7.

TABLE 7

| g of component: | Ink UV-2 |
|---|---|
| Ink UV-1 | 4.0 |
| Glycerol | 9.0 |
| Alkanol ™ XC | 0.1 |
| water | 1.9 |

After filtering the inkjet ink UV-2 over a 1.3 μm filter, the jetting performance of the inkjet ink UV-2 was evaluated using a Dimatix™ DMP2831 system, equipped with a standard Dimatix™ 10 pl print head. The ink was jetted at 23° C. on a PU Plate, using a firing frequency of 5 kHz, a firing voltage of 25 V, a standard waveform and a standard cartridge setting. The aqueous inkjet ink UV-2 proved to have an excellent jettability, but exhibited a pale cyan colour on the PU plate. The latter is caused by a more than 22 times dilution of the original pigment concentration in the state-of-the-art UV free radical curable inkjet ink INK-1.

Example 2

This example illustrates the preparation of an aqueous UV free radical curable inkjet ink in accordance with the invention for obtaining a high colour density and low migration properties.

Preparation of the Aqueous UV Free Radical Curable Inkjet Ink UV-3

Under stirring 0.73 g of Omnipol™ TX, 0.73 g Genopol™ AB1 en 1.37 g of Omnipol™ 9210 were added to 19.43 g of the concentrated cyan pigment dispersion CPD1 of Example 1 to form the cyan pigment dispersion CPD2.

Then 22.26 g of CPD2 was added to a solution of 15.00 g E7701 in 62.74 g of water. The mixture was stirred for 5 minutes using a high-speed stirrer (Homorex™) and then passed through a Type M110F high pressure homogenizer from MICROFLUIDICS™ Corporation at a pressure of 300 bar to obtain the aqueous UV free radical curable inkjet ink UV-3.

Evaluation and Results

The aqueous UV free radical curable inkjet ink UV-3 was coated on a 100 μm PET foil using a 10 μm wired bar and air dried for 1 minute. The coated sample was UV cured, using a Fusion DRSE-120 conveyer, equipped with a Fusion VPS/1600 lamp (D-bulb). The sample was passed under the lamp at a belt speed of 20 m/min and at full power of the lamp.

The dry rub resistance of the UV cured sample was evaluated and found to have an evaluation value of 0 (no visual damage).

The aqueous UV free radical curable inkjet ink UV-3 had a pigment concentration of 2.9 wt % similar to that of the state-of-the-art UV free radical curable inkjet ink INK-1 and was capable of producing cyan images of the same optical density. The aqueous UV free radical curable inkjet inks UV-3 and UV-1 or UV-2 could be used as a full density respectively a light density aqueous UV free radical curable inkjet ink in an ink set.

REFERENCE SIGNS LIST

Table 8 shows the reference numerals used in FIG. 1.

TABLE 8

| 1 | Aqueous UV free radical curable inkjet ink |
|---|---|
| 2 | Continuous liquid phase B |
| 3 | Polymeric dispersant |
| 4 | Polymerizable compounds |
| 5 | Colour pigment |
| 6 | Photoinitiator |

The invention claimed is:

1. An aqueous UV free radical curable inkjet ink comprising:
   a liquid phase A dispersed in a continuous liquid phase B by a polymeric dispersant; wherein
   the liquid phase A includes at least a photoinitiator, a color pigment, and one or more polymerizable compounds;
   the continuous liquid phase B includes water and optionally one or more organic solvents; and
   the aqueous UV free radical curable inkjet ink does not contain an amphiphilic urethane (meth)acrylate or a polymer thereof.

2. The aqueous UV free radical curable inkjet ink according to claim 1, wherein the photoinitiator includes a polymeric photoinitiator or a polymerizable photoinitiator.

3. The aqueous UV free radical curable inkjet ink according to claim 1, wherein the liquid phase A is present in an amount of less than 30 wt % based on a total weight of the aqueous UV free radical curable inkjet ink.

4. The aqueous UV free radical curable inkjet ink according to claim 1, wherein the one or more polymerizable compounds include difunctional polymerizable compounds and/or polyfunctional polymerizable compounds.

5. The aqueous UV free radical curable inkjet ink according to claim 1, wherein the liquid phase A includes a thiol compound including at least two thiol groups.

6. The aqueous UV free radical curable inkjet ink according to claim 5, wherein the at least two thiol groups are at least two secondary thiol groups.

7. The aqueous UV free radical curable inkjet ink according to claim 1, wherein the one or more polymerizable compounds include acrylates.

8. The aqueous UV free radical curable inkjet ink according to claim 1, wherein the one or more polymerizable compounds are selected from a group consisting of vinyls, vinyl carbonates, vinyl ethers, vinyl esters, vinyl carbamates, allyl ethers, allyl esters, and alkyne compounds.

9. An inkjet printed substrate comprising:
   a substrate; and
   a cured layer of the aqueous UV free radical curable inkjet ink according to claim 1 on the substrate.

10. The inkjet printed substrate according to claim 9, wherein the substrate is selected from the group consisting of a polyethylene terephthalate substrate, a polylactic acid substrate, a PVC substrate, a textile substrate, a leather substrate, a paperboard substrate, a corrugated substrate, and a wood substrate.

11. An inkjet printing device comprising more than one aqueous UV free radical curable inkjet ink according to claim 1.

12. A method of manufacturing an aqueous UV free radical curable inkjet ink comprising the steps of:
- providing a liquid phase A including at least a photoinitiator, a color pigment, and one or more polymerizable compounds;
- providing a continuous liquid phase B including a polymeric dispersant, water, and optionally one or more organic solvents; and
- dispersing the liquid phase A in the continuous liquid phase B; wherein
- the aqueous UV free radical curable inkjet ink does not contain an amphiphilic urethane (meth)acrylate or a polymer thereof.

13. An inkjet printing method comprising, in order, at least the steps of:
- jetting an aqueous UV free radical curable inkjet ink according to claim 1 on a substrate;
- applying heat and/or infrared light to the aqueous UV free radical curable inkjet ink jetted on the substrate; and
- applying UV light to the aqueous UV free radical curable inkjet ink jetted on the substrate.

14. The inkjet printing method according to claim 13, wherein the step of applying infrared light includes applying red light from a NIR or a SWIR source, and the step of applying UV light includes applying UV light from UV LEDs.

* * * * *